(12) United States Patent
Lofthus et al.

(10) Patent No.: US 6,608,643 B2
(45) Date of Patent: Aug. 19, 2003

(54) SYSTEMS AND METHOD FOR MEASURING OR REDUCING SPACING ERRORS IN MULTIPLE BEAM ROS SYSTEMS

(75) Inventors: Robert M. Lofthus, Webster, NY (US); Patrick Y. Maeda, Mountain View, CA (US); Daniel W. Costanza, Webster, NY (US); Kristine A. German, Webster, NY (US); Fred F. Hubble, III, Rochester, NY (US); Robert P. Loce, Webster, NY (US)

(73) Assignee: Xerox Corporation, Stamford, CT (US)

( * ) Notice: Subject to any disclaimer, the term of this patent is extended or adjusted under 35 U.S.C. 154(b) by 32 days.

(21) Appl. No.: 10/046,234

(22) Filed: Jan. 16, 2002

(65) Prior Publication Data

US 2003/0132372 A1 Jul. 17, 2003

(51) Int. Cl.$^7$ .................................................. B41J 2/47
(52) U.S. Cl. ...................................... 347/240; 347/251
(58) Field of Search ....................... 250/201.8; 356/399, 356/400; 347/240, 251, 254, 248, 234; 399/49

(56) References Cited

U.S. PATENT DOCUMENTS

| | | | | |
|---|---|---|---|---|
| 3,674,926 A | * | 7/1972 | Dewey et al. | |
| 4,285,004 A | * | 8/1981 | Morrison et al. | |
| 4,441,817 A | * | 4/1984 | Pryor | |
| 4,827,527 A | * | 5/1989 | Morita et al. | |
| 5,231,428 A | * | 7/1993 | Domoto et al. | |
| 5,287,125 A | | 2/1994 | Appel et al. | |
| 5,404,202 A | * | 4/1995 | Abramsohn | |
| 5,469,290 A | | 11/1995 | Maeda | |
| 5,574,544 A | * | 11/1996 | Yoshino et al. | |
| 5,694,637 A | * | 12/1997 | Yoshino et al. | |
| 6,321,043 B1 | * | 11/2001 | Grace | |
| 2002/0196437 A1 | * | 12/2002 | Tandon et al. | |

* cited by examiner

*Primary Examiner*—Diego Gutierrez
*Assistant Examiner*—Gail Verbitsky
(74) *Attorney, Agent, or Firm*—Oliff & Berridge, PLC

(57) ABSTRACT

An apparatus for correcting beam-to-beam spacing error on an image plane of a photoreceptor includes a controller which generates beam-to-beam spacing error corrections signals, a plurality of optical elements, each of which is adjustable and responsive to beam-to-beam spacing error correction signal and a gray level measurement device. The controller performs the beam-to-beam spacing error correction analysis, determining whether or not a correction is necessary, and if so, which optical element to adjust and the magnitude of adjustment. Enhanced toner area coverage sensors are used to detect the gray level of a toned area of raster scan line patterns at various locations across the photoreceptor image plane. By repeatedly evaluating the beam-to-beam spacing error during operation, the apparatus of the invention is able to correct beam-to-beam spacing errors that may develop during operation and does not permit residual errors to persist even after an initial correction has been implemented.

25 Claims, 19 Drawing Sheets

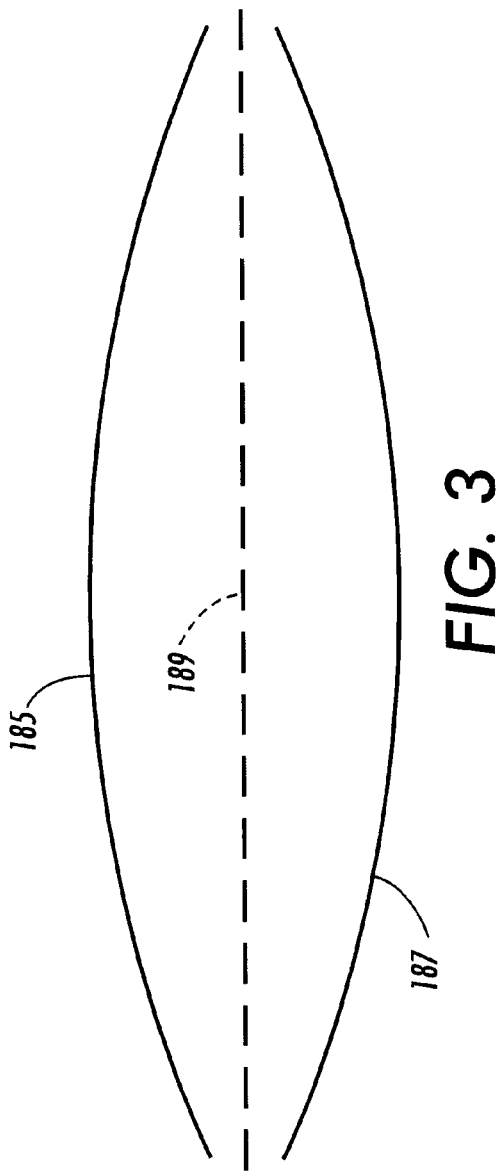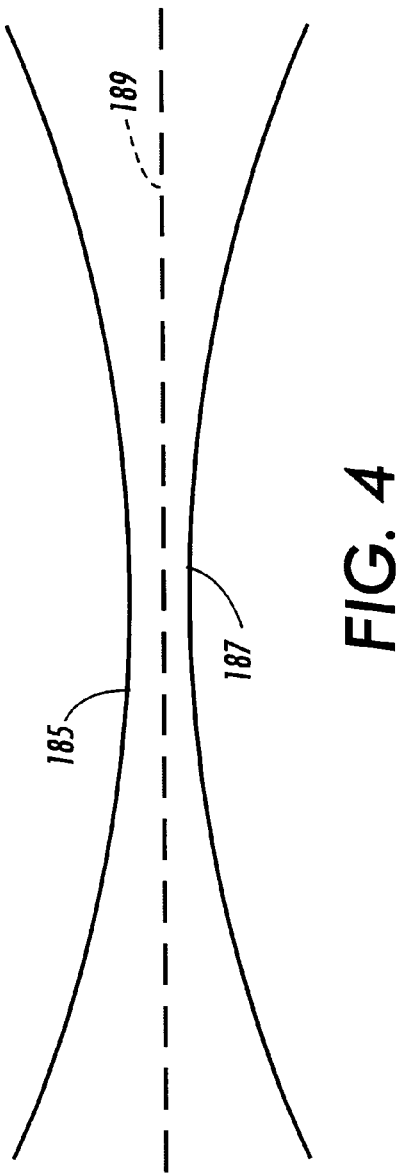

SYSTEMS AND METHOD FOR MEASURING OR REDUCING SPACING ERRORS IN MULTIPLE BEAM ROS SYSTEMS

BACKGROUND OF THE INVENTION

1. Field of Invention

This invention is generally related to an image forming apparatus which uses multi-beam raster output scanners (ROS) to form images on a medium.

2. Description of Related Art

Prealigned dual and quad laser diodes are very expensive. While prealigned dual laser diodes are desirable in xerographic based electronic printers and copiers, due to cost considerations, individual laser diodes are normally used. FIGS. 1 and 2 illustrate top and side views, respectively, of a conventional rotating polygon-based optical system 100 and a known rotating polygon 140. It should be appreciated that the functions described below equally apply to most rotating polygon-based systems, independently of the number of light sources used.

As shown in FIGS. 1 and 2, the ROS optical system 100 includes a pair of sagittally offset laser diodes 102 and 103 that emit laser beams 121 and 123, respectively. The laser beams 121 and 123 emitted by the laser diodes 102 and 103 are collimated by a collimator lens 110. A sagittal aperture stop 120 is placed in a position where the laser beams 121 and 123 cross the system optical axis 500, to control the aperture size, which in turn controls the spot size on the photoreceptor image plane 182. The input cylinder optical elements 130 and 131 focus the laser beams 121 and 123 on the surface of the current polygon facet 144 of the rotating polygon 140. After reflecting from the current polygon facet 144, the laser beams 121 and 123 pass through the Fθ lens 150. The Fθ lens 150, in general, has relatively low power in the tangential meridian. The Fθ lens 150 focuses the laser beams 121 and 123 in the tangential meridian to control the scan linearity in terms of uniform spot displacement per unit angle of polygon rotation. A sagittal aperture stop 160 is placed in a position where laser beams 121 and 123 again cross the system optical axis 500.

A motion compensating optical element (MCO) 170 then reimages the focused laser beams 121 and 123 from the current polygon facet 144 onto the photoreceptor image plane 182 at a predetermined position, independently of the polygon angle error or tilt of the current facet 144. Such compensation is possible because the focused laser beams 121 and 123 are stationary "objects" before the Fθ lens 150 and the motion compensating optical (MCO) element 170. Although, due to a polygon tilt or wobble, the laser beams 121 and 123 are reflected to different positions of the post polygon optics aperture for each different facet of the rotating polygon, the beams 121 and 123 are imaged to the same position on the photoreceptor image plane 182.

SUMMARY OF THE INVENTION

In rotating polygon, ROS-based xerographic copiers and printers, distortions occur from several sources of beam spacing errors. The sources of beam spacing errors in multi-beam rotating polygon based optical systems illustrated in FIG. 2 are optical and/or mechanical in nature. Beam spacing errors fall into one of the following categories: residual errors in the nominal design, thermal effects, vibration, and fabrication and wear errors in the various optical and mechanical components in the system.

Nominal differential bow is a source of residual beam spacing error. Even if the components were perfectly fabricated and assembled, beam-to-beam differential bow error will be present because the optical design cannot completely eliminate image distortion, as illustrated in FIGS. 3 and 4. Variations in ambient temperature produce changes in the refractive index, position, and thickness of optical components. These changes cause differences in scan line shape and position, as shown in FIGS. 5 and 6. Mechanical vibrations result in changes in scan line position, which can lead to beam spacing error.

FIGS. 3–6 illustrate the various types of errors which can be introduced by differential scan line bow. FIG. 3 shows a barrel type bow distortion. Specifically, FIG. 3 shows the center of curvatures of a pair of bowed scan lines 185 and 187 located on opposite sides of an ideal scan line 189 in such a fashion that the bowed scan lines create a barrel distortion. This occurs whether the bowed scan lines 185 and 187 have the same or different radius of curvature.

FIG. 4 shows a pin cushion type bow distortion. Specifically, FIG. 4 shows the center of curvature of the bowed scan lines 185 and 187 are also on the opposite side of the ideal scan line 189 (with the same or different radii). However, the arrangement of the bowed scan lines 185 and 187 relative to each other forms a pin cushion distortion. Again, this occurs whether the bowed scan lines 185 and 187 have the same or different radii of curvature.

FIG. 5 shows the ideal scan line 189 as a dashed line. In FIG. 5, first bowed scan line 187 has a first radius of curvature which is different from the radius of curvature of the second bowed scan line 185.

FIG. 6 shows bowed scan line 185 superimposed over the bowed scan line 187. As shown in FIG. 6, the bowed scan line 185 has a center of curvature which is on the opposite side of the ideal scan line 189 from the center of curvature of the bowed scan line 187. As can be seen from FIGS. 3–6, the bow appears as a displacement of a scan line in the process direction as the line extends in the fast scan direction.

As shown in FIG. 7, there are shown a plurality of dashed lines representing ideal raster scan line paths 175 across a photoreceptor. The scan line spots 121' and 123' and 121" and 123", are shown with respect to each other and with respect to the ideal scan line path 175. Ideally, the raster scan line spots 121', 123', 121" and 123" travel across the photoreceptor within the corresponding ideal scan line paths 175. However, due to the factors discussed above, the raster scan line spots 121', 121", 123', and 123" often, if not usually, do not travel within the ideal scan line paths 175.

As can be seen on the left side of FIG. 7, the raster scan spots 121" and 123" are separated from each other by a distance Y and do not lie within ideal scan line paths 175. On the right side of FIG. 7, the raster scan spots 121' and 123' overlap by a distance X. It should be appreciated that, due to bow and the like, as the raster scan spots 121',121",123', and 123" move across the photoreceptor, the distortions shown in FIGS. 3–6 develop.

Fabrication variations in material parameters, component geometry, and assembly, manifested in misalignment, improper beam conditioning and defocusing, result in both uniform and non-uniform variation of the beam spacing across the image plane. Local variations in the photoreceptor and tilt errors among the various facets 141–148 of the polygon mirror 140, for example, produce variation in process direction beam position from scan to scan. Curvature error in the lenses can produce either a widening or narrowing of the distance between scanning beams. All of the optical elements of a multi-beam rotating polygon-based optical system 100 may therefore introduce a degree of beam-to-beam spacing error. The combination of errors creates an error unique to each machine, and is commonly referred to as the constant beam-to-beam spacing error.

It also should be appreciated, however, that the constant beam-to-beam spacing error is constant over a limited time period, such as that of several scans to that of hours, days or even longer. That is, the constant beam-to-beam spacing error slowly changes over time. The component parts of the multi-beam rotating polygon-based optical system 100 and the assembly tolerances of those parts tend to slowly deteriorate over time, thus imparting a variable quality to the otherwise constant beam-to-beam spacing error. Consequently, it is more accurate to describe the constant beam-to-beam spacing error as a semi-static beam-to-beam spacing error.

Thus, in the conventional multi-beam rotating polygon-based optical system 100 described above, the scan lines usually either improperly overlap or are excessively spaced apart. The raster scan shown in FIG. 7, illustrates beam-to-beam spacing and overlap errors for two different sets of dual laser diodes resulting from either differential scan line bow and/or the constant or semi-static errors. Optical system designs can incorporate compensators or adjustments to correct for this error type, but in many cases residual errors persist even after correction has been implemented.

This invention provides systems and methods for detecting beam-to-beam spacing errors on the image plane of a photoreceptor during operation of a xerographic based electronic printer.

This invention separately provides systems and methods for automatically adjusting for beam-to-beam spacing errors on the image plane of a photoreceptor during operation of a xerographic based electronic printer.

This invention separately provides systems and methods for measuring average density variations in test patterns representative of raster scan line spacing errors on the image plane of a photoreceptor during operation of a xerographic based electronic printer.

This invention separately provides systems and methods to enable a xerographic printer user to obtain an image without objectionable banding artifacts.

In various exemplary embodiments, the systems and methods of the invention provide for specific beam-to-beam spacing error adjustments so that residual errors do not remain even after adjustments have been made. If a first adjustment is not sufficient to fully correct the beam-to-beam spacing errors, in various exemplary embodiments, the systems and methods of the invention are designed to reevaluate the beam-to-beam spacing errors to reduce, or ideally remove, such residual errors.

In various other exemplary embodiments, the systems and methods of this invention use a conventional rotating polygon based optical system, gray level measurement devices, a controller and means to measure and possibly adjust for beam-to-beam spacing errors.

In various exemplary embodiments, the apparatus of this invention uses a conventional rotating polygon-based optical system having two or more light sources and several optical elements. One or more of the various light sources and/or optical elements are adjustable in response to an error signal generated by the controller in view of signals received from one or more gray level measurement devices.

In various exemplary embodiments, two or more sensors of a gray level measurement device are located at fixed positions along the axial length of the photoreceptor. In various other exemplary embodiments, the apparatus includes a single gray level measurement device that is movable along between the ends of the photoreceptor. The movable sensor of the gray level measurement device can detect developed mass per unit areas for the full width of the photoreceptor. In various other exemplary embodiments, the gray level measurement device includes two sensors located relative to the width of the photoreceptor. In this case, each sensor can be moved over a portion of the photoreceptor. Each sensor detects a developed mass per unit area of a viewed area on the photoreceptor. Each sensor generates a signal corresponding to the developed mass per unit area in the viewed area and sends the signal to the controller.

The controller generates a beam-to-beam spacing error signal based on the sensor signals and determines which optical element or laser diode can be adjusted to adjust for the error that occurs in the viewed area. The controller signal is then sent to one or more appropriate optical elements and/or light sources, implementing the adjustment.

In various exemplary embodiments, the gray level measurement devices are implemented using enhanced toner area coverage sensors.

In various other exemplary embodiments, the apparatus includes a conventional polygon-based optical system having four light sources and several optical elements. The four light sources may be implemented as a combination of 4 single light sources or 2 double light sources. In various other exemplary embodiments, the apparatus includes a conventional polygon-based optical system having 2 single light sources and several optical elements.

In various other exemplary embodiments, the apparatus includes more than gray level measurement devices.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail with respect to the following drawings, in which like reference numerals indicate like elements, and wherein:

FIG. 3 shows a barrel distortion between a pair of bowed scan lines having centers of curvature on opposite sides with the same or different radii;

FIG. 4 shows a pin cushion distortion between a pair of bowed scan lines having centers of curvature on opposite sides with the same or different radii;

DETAILED DESCRIPTION OF EXEMPLARY EMBODIMENTS

Figure 1:
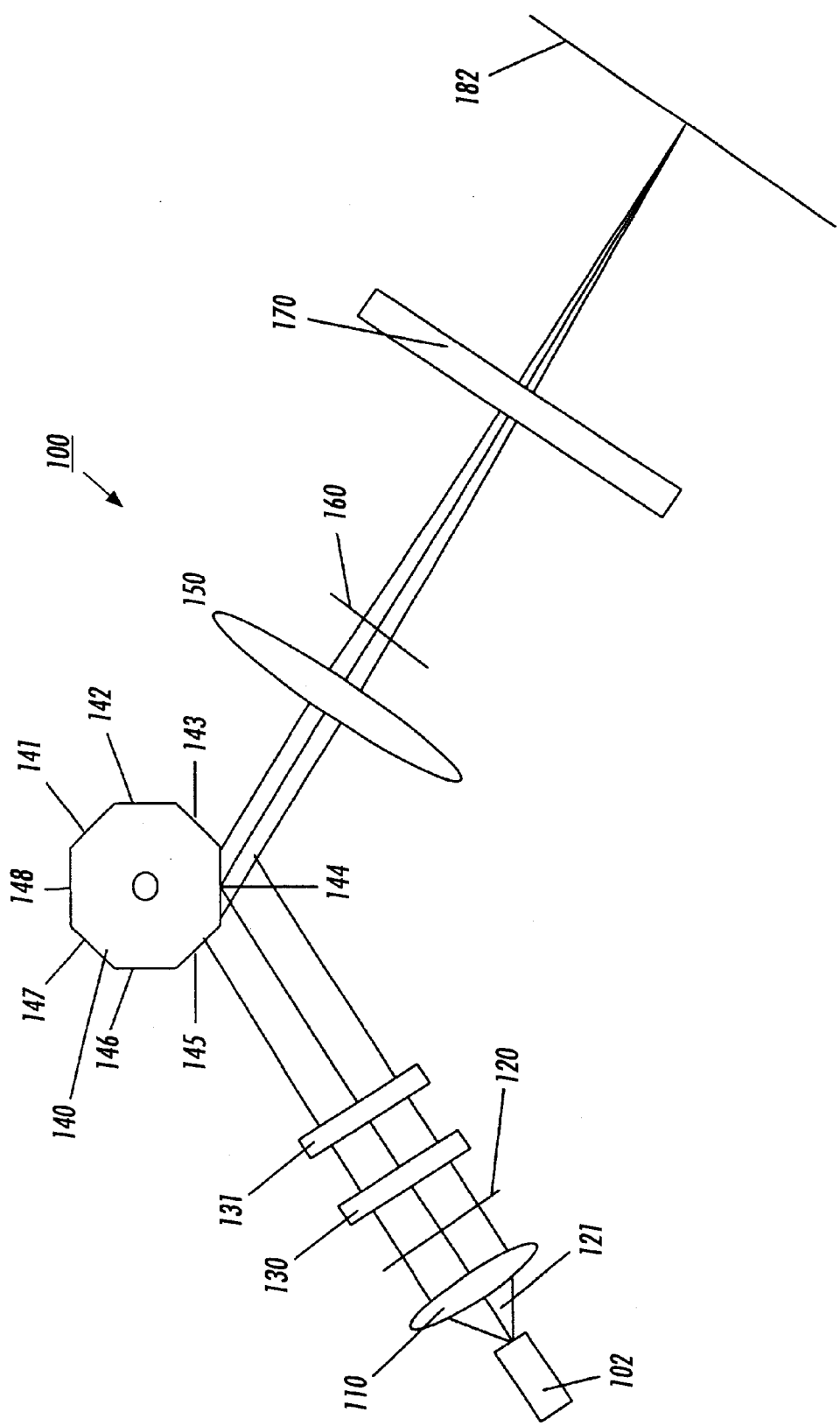
FIG. 1 shows a top plan view of the conventional polygon ROS image forming device.
Figure 2:
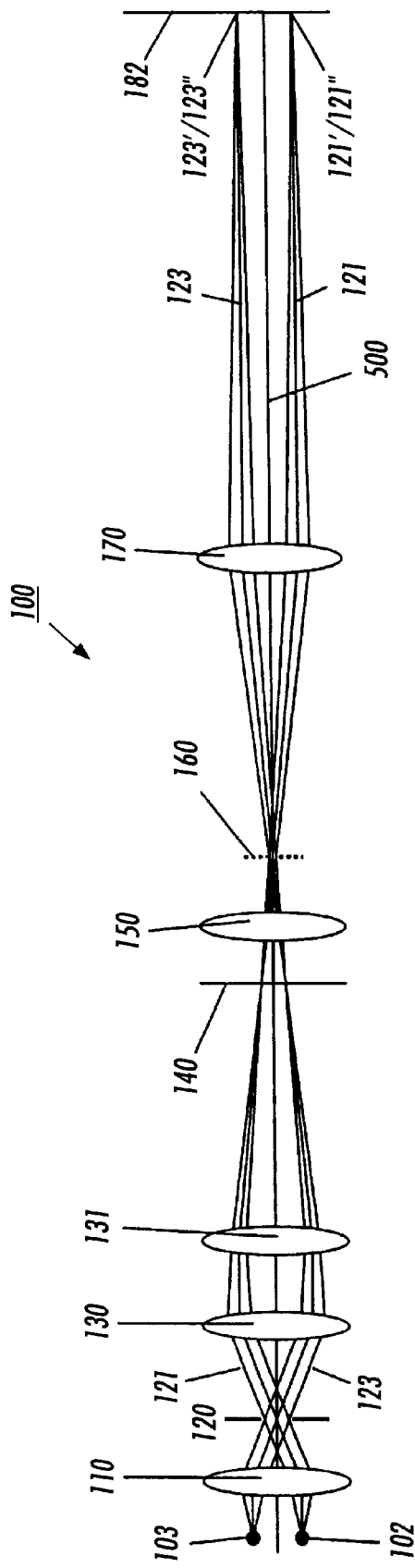
FIG. 2 shows a side plan view of one exemplary embodiment of an optical configuration of an ROS image forming device using two single laser diodes.
Figure 5:
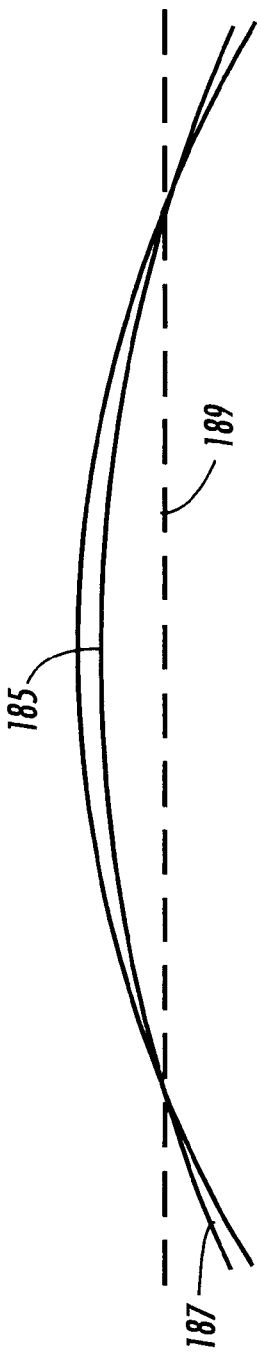
FIG. 5 shows a pair of bowed scan lines having the center of curvatures on the same side of the optical axis but with different radii of curvatures.
Figure 6:
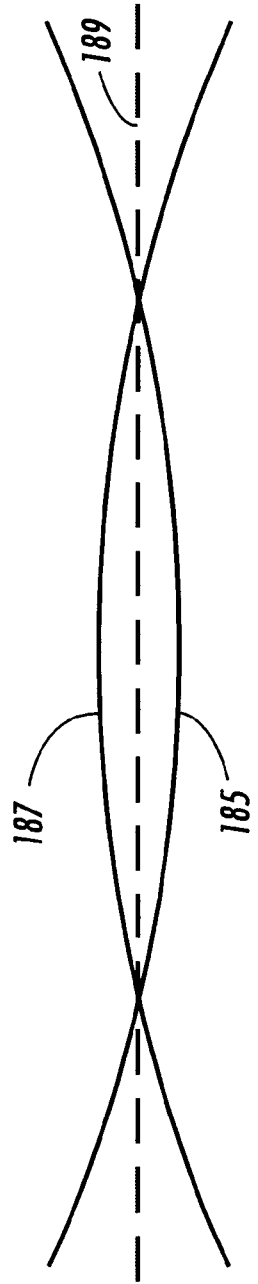
FIG. 6 shows a pair of bowed scan lines having centers of curvature on opposite sides of the optical axis with the same or different radii.
Figure 7:
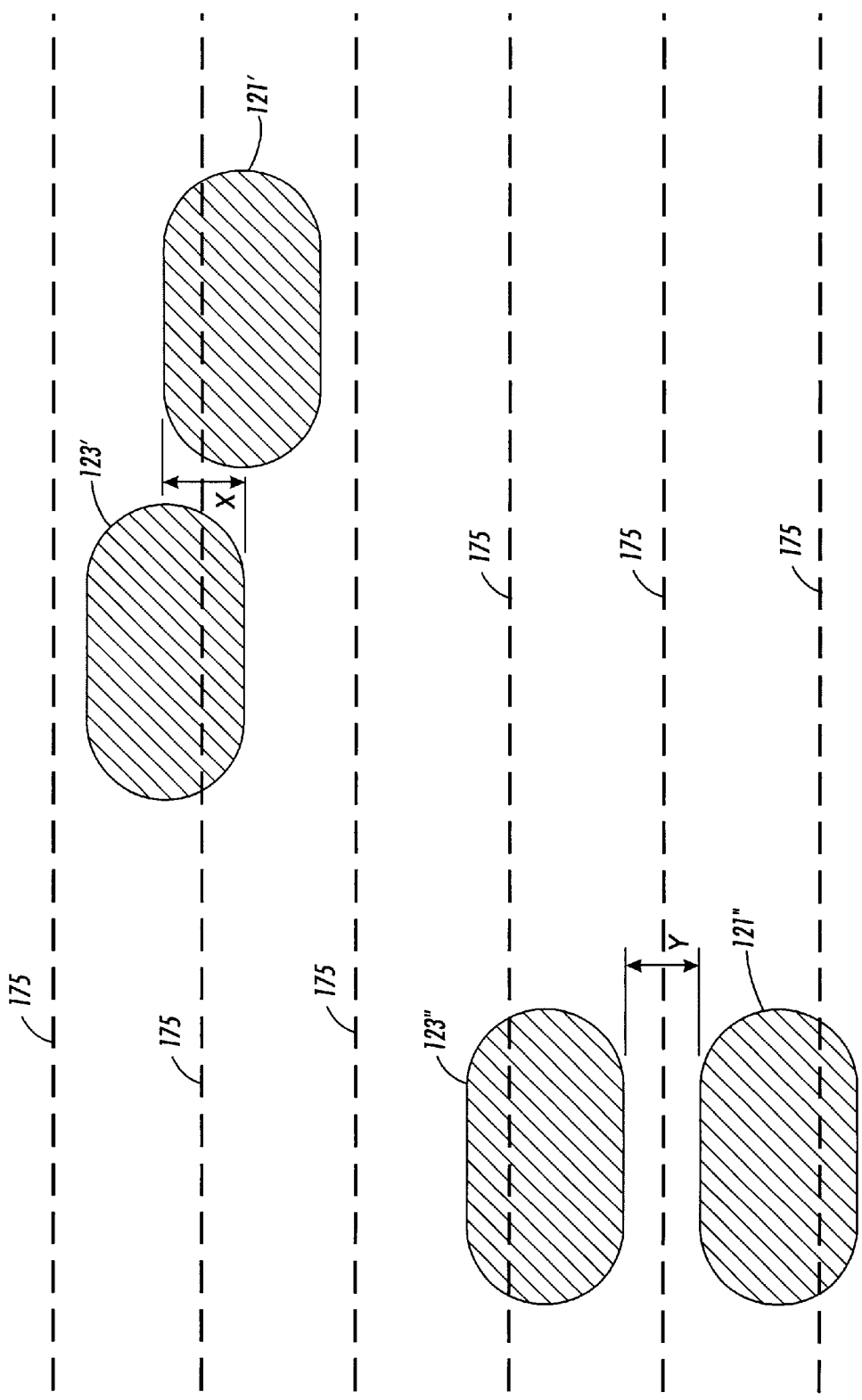
FIG. 7 shows first and second sets of spots created by laser beams on a photoreceptor, showing a gap between spots and an overlap between spots.
Figure 8:
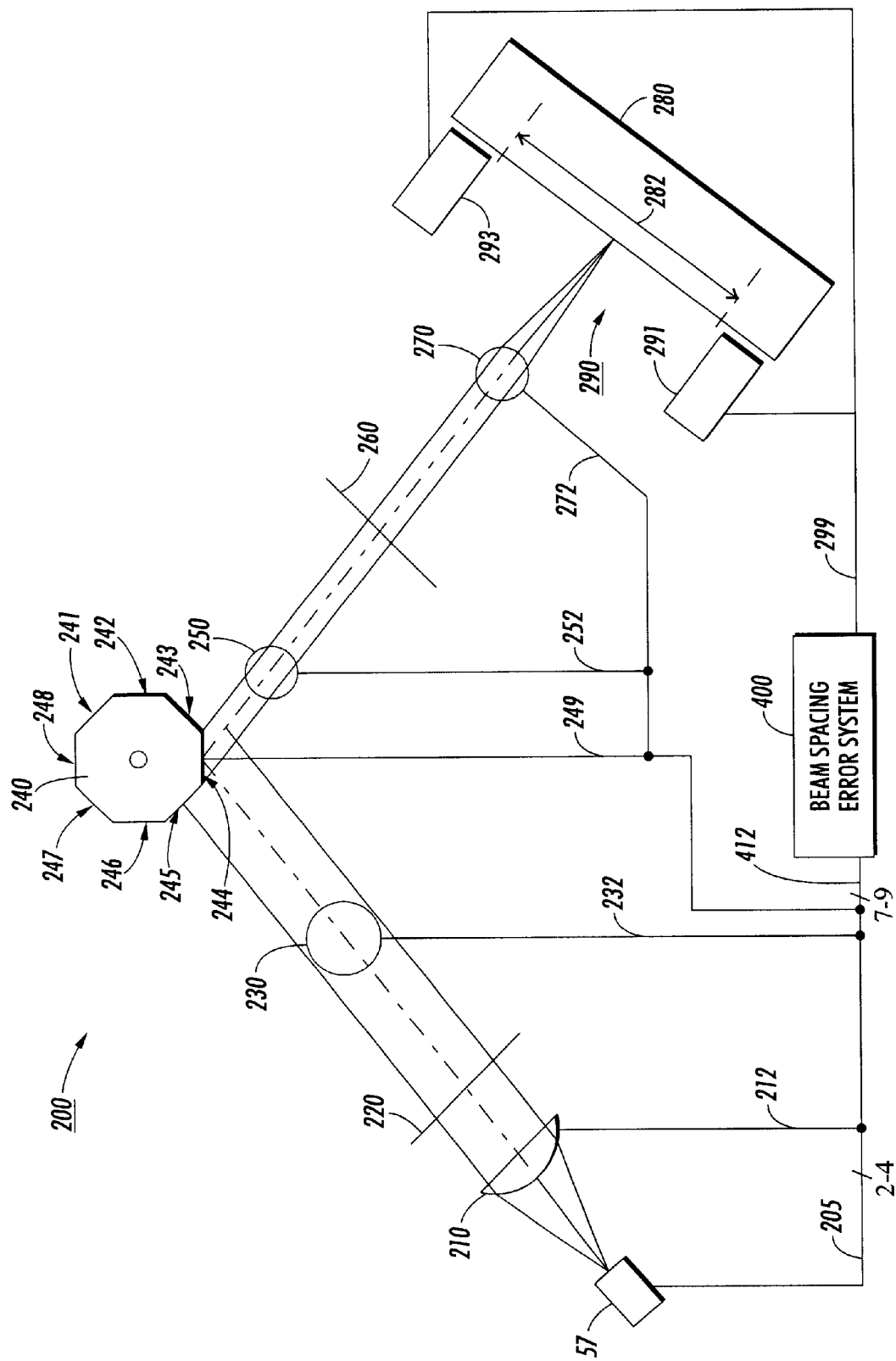
FIG. 8 shows a top plan view of one exemplary embodiment of a polygon ROS image forming device with a pair of gray level measurement devices and a controller according to this invention.
Figure 9:
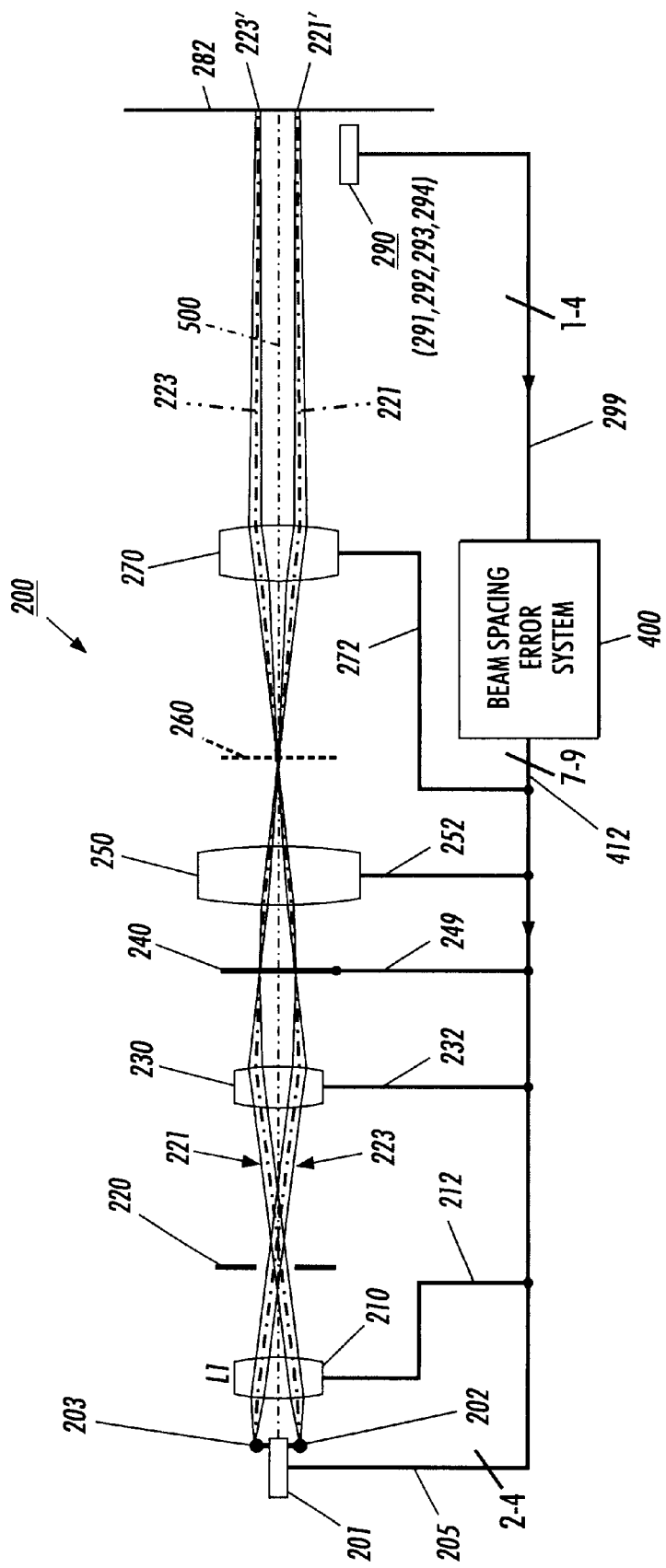
FIG. 9 shows a side elevation view of one exemplary embodiment of an optical configuration of an ROS image forming device according to this invention using two single laser diodes.

FIGS. 8 and 9 show a first exemplary embodiment of the optical system 200 used to measure and/or reduce beam-to-beam spacing errors according to this invention. The optical system 200 includes a polygon scanning raster output scanner 240 (polygon ROS) and a pair of light sources 202 and 203 emitting light beams 221 and 223, respectively.

It should be further appreciated that each light source 202 and 203 can each emit the corresponding light beams 221 and 223 at a wavelength different from the wavelengths of the light beam 221 or 223 emitted by the other light source 202 or 203. In various exemplary embodiments, the light sources 202 and 203 are laser diodes. However, the optical system 200 is not limited to using laser diodes. Any known light emitting device, such as any solid state laser, gas laser, liquid laser or semiconductor laser can be used. Further, a light emitting diode or the like can be used, so long as the emitted light beam can be modulated, either as the light beam is output, or by an intervening optical, opto-electronic, opto-mechanical or opto-acoustic device.

The light beams 221 and 223 pass through a series of optical elements to form scanning spots 221' and 223', respectively, on an image plane 282 of a photoreceptor 280. The optical elements of the optical system 200 as described herein, include, but are not limited to, one or more of collimator lenses, sagittal aperture stops, cylindrical lenses, polygon facet surfaces, and motion compensated optics (MCO).

For example, in the exemplary embodiment shown in FIGS. 8 and 9, the light beams 221 and 223 first pass through a collimator lens 210 and cross the system optical axis 500 at a sagittal aperture stop 220. The light beams 221 and 223 then pass through a input cylindrical lens 230 and are focused onto a polygon facet 244 of the rotating polygon 240. The rotation of the polygon facet 244 causes the light beams 221 and 223 to be scanned across the image plane 282 of the photoreceptor 280. After being reflected by the polygon facet 244, the light beams 221 and 223 pass through an Fθ scan lens 250 and again cross the system axis 500 at the image of the sagittal aperture stop 260. This is also the back focal plane of the anamorphic motion compensating optics (MCO) 270. It should be noted that, in this case, the image of the sagittal aperture stop 260 is not only in front of the image plane 282, but is also in front of the MCO 270. In various exemplary embodiments, the MCO 270 comprises a cylindrical lens or cylindrical mirror.

Figure 10:
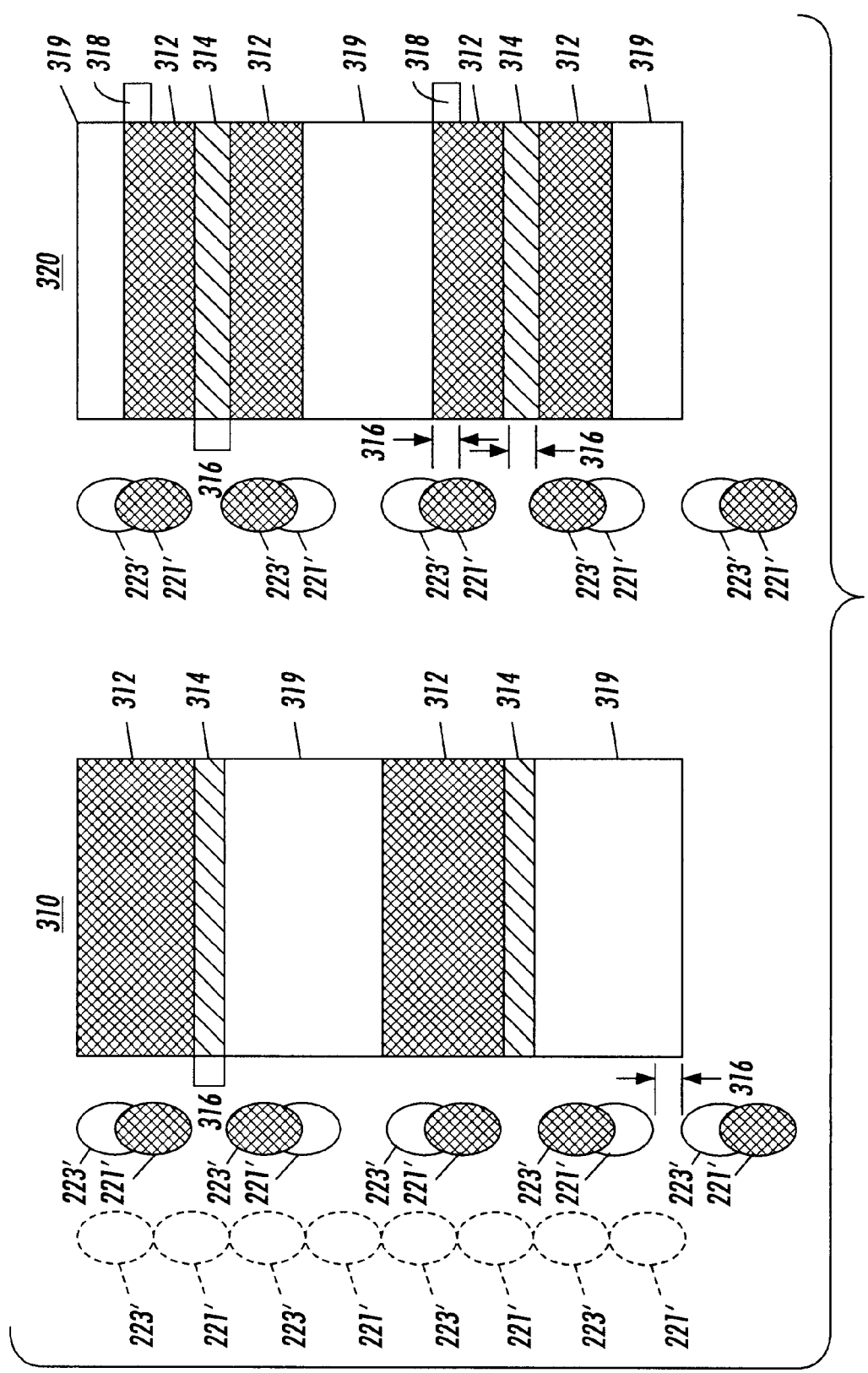
FIG. 10 illustrates a set of patterns usable to determine beam spacing offset between raster lines on the photoreceptor device produced by dual laser diodes, according to this invention.

After passing through (or being reflected by) the MCO 270, the light beams 221 and 223 are focused onto the image plane 282 to form the scanning spots 221' and 223', respectively. In general, after passing through the MCO 270, the light beams 221 and 223 are parallel to the system axis 500. That is, light beams 221 and 223 are typically designed to be telecentric or near telecentric between the MCO 270 and the image plane 282. It should be appreciated that either element of the output optics can have a toroidal surface. In addition, the toroidal surface can have a uniform or non-uniform radius, in either the sagittal or tangential direction. The scanning spots 221' and 223' move across the image plane 282 to form the scan lines 175. The scan lines 175 thus formed have the previously described beam-to-beam spacing errors, and can include bow line distortions and/or semi-static errors. Additionally, a number of sets of the scan lines 175 may be produced to define scan line patterns. Different scan line patterns are defined by turning one and then the other of the light sources 202 and 203 on and off. Alternatively, both laser diodes 202 and 203 may be on and off together. FIG. 10 shows examples of two scan line patterns formed in a test patch that can be created on the photoreceptor 280.

As shown in FIGS. 8 and 9, a gray level measurement system 290 is located near the photoreceptor 280 and sends a signal to a beam spacing error system 400 corresponding to a gray level detected in a test patch formed on the photoreceptor 280 using the optical system 200. In various exemplary embodiments, the gray level measurement system 290 includes at least one densitometer. However, the gray level measurement system 290 can use any type of sensor that can generate an output signal that is representative of an amount of toned area in the test patch. In the exemplary embodiment shown in FIGS. 8 and 9, the gray level measurement system 290 includes two densitometers 291 and 293. Particularly, the densitometers 291 and 293 used in this first exemplary embodiment are enhanced toner area coverage sensors (also referred to as an ETAC sensor or an ETACS), which are process controlled sensors utilized in a xerographic process to measure the developed mass per unit area (DMA) of scan line patterns developed on the photoreceptor 280, such as the scan line patterns 310 and 320 shown in FIG. 10 and discussed below in greater detail. Enhanced toner area coverage sensors have one or both of two possible output signals, a specular reflection signal and a diffuse reflection signal.

The specular reflection output signal is a measure of the specular reflection from the developed test patch formed on the photoreceptor 280. The enhanced toner area coverage sensor is calibrated by increasing the radiance of the sensor's infrared emitter until a predetermined voltage is reached. As the amount of toner developed onto a test patch increases, the specular (mirror-like) reflection from the underlying reflective photoreceptor decreases while the diffuse reflection from the toner particles increases. As a result, the specular output signal decreases. Once a continuous layer of toner has been developed onto the surface of the photoreceptor 280, the specular signal is essentially gone and the diffuse output is saturated.

The other output is a measure of the diffuse reflection from the surface of the substrate being measured. When a clean area is measured, a generally low signal is obtained, proportional to the base diffuse reflectance of the photoreceptor 280. Since color toners are generally diffusely reflective, as the amount of toner developed onto the photoreceptor increases, the output of the diffuse signal increases. The range of the diffuse signal is greater than that of the specular signal since, as the depth of the toner layer increases, less light is lost to specular reflection, absorption or transmission and is instead converted into diffuse radiation. The diffuse output has a measurement range of approximately 0–1.5 mg/cm$^2$ with 7 micrometer toners. Diffuse reflection is thus able to measure in regions better suited for control of the color process. The diffuse signal does not work with black toners. These toners absorb incident radiation. Thus, the signal will decrease when measuring test patches developed using black toners.

The rotating polygon based optical system 200 and rotating polygon multi-beam raster output scanner 240 shown in FIGS. 8 and 9 also includes the beam spacing error system 400. The beam spacing error system 400 receives the one or more signals generated by each of the one or more densitometers 291 and 293 of the gray level measurement system 290 over one or more signal lines 299. In various exemplary embodiments, based on one or more signals from the gray level measurement system 290, the beam spacing error system 400 determines the beam-to-beam spacing error.

In various other exemplary embodiments, the beam spacing error system 400 determines, based on the one or more signals from the gray level measurement system 290, when an adjustment to one or more optical elements that will reduce the beam-to-beam spacing error is indicated. The values of the one or more signals from the gray level measurement system 290 are used by the beam spacing error system 400 to adjust one or more optical elements to lessen the beam-to-beam spacing error until the value of the gray level difference value ΔG indicated by the one or more signals from the gray level measurement system 290 is at least within a desired tolerance around zero. The beam spacing error system 400 can output adjustment signals for one or more optical elements to be adjusted to the appropriate one or more optical of the optical elements 201, 210, 230, 240, 250, 260 and 270 over the signal lines 412 and the appropriate one or more of the signal lines 205, 212, 232, 249, 252 and 272, respectively.

As shown in FIG. 10, the dashed ovals on the far left of the Figure represent the ideal arrangement of the scan spots 221' and 223' into the scan lines 175 at the image plane 282, for each pass of the light beams 221 and 223. The scan line pattern 310 represents a pattern where both of the light sources 202 and 203, having one or more of the above-outlined beam spacing errors, are turned on for a first pass and then both light sources 202 and 203 are turned off for the next pass. As shown in FIG. 10, the scan spots 221' and 223', and thus the resulting scan lines overlap, distorting the desired pattern 310.

The right side of FIG. 10 shows a second scan line pattern 320. The second scan line pattern 320 represents a pattern where, for each pass of the light beams 221 and 223, one of the two light sources 202 and 203 is turned off and the other is turned on. Additionally, the scan spots 221' and 223', and thus, the resulting scan lines are spaced apart by a gap between the scan lines, distorting the desired pattern 320.

It should be appreciated that, in various exemplary embodiments, the patterns 310 and 320 extend along the photoreceptor 280 in the direction of travel of the photoreceptor for a non-negligible distance. In this case, the patterns 310 and 320 are repeatedly formed so that the area of the photoreceptor on which the patterns 310 and 320 are formed extends along the direction of travel of the photoreceptor 280. In various exemplary embodiments, the patterns 310 and 320 can extend for several inches or even longer, such as entirely around the circumference of the photoreceptor 280.

The patterns 310 and 320 extend in a non-negligible distance because, in various exemplary embodiments, the gray level measurement system 290 uses low-bandwidth sensors, such as the enhanced toner area coverage sensors, that are designed to determine an average toner amount over an appreciable area, rather than determining if any specific location contains toner.

It should be appreciated that, if there is no spacing error in the positions of the light beams 221 and 223 on the image plane 282, the two scan line patterns 310 and 320 would be identical in the relative size of the toned to untoned areas but out of phase. Thus, the toned area 312 and the clear area 319 would be the same size and would not be broken up into sub-areas, as in the scan line pattern 320 shown in FIG. 10.

FIG. 10 shows a hatched area 314 which represents the clear portion 319 that should be part of the toner portion 312. The hatched area 314 has a height 316. Additionally, the size of the toned area portion 312, which should be part of the clear portion 319, has a height 318.

It should also be appreciated that, in the exemplary embodiment shown in FIG. 10, the light beams 221 and 223 overlap due to the beam spacing errors. In contrast, the light beams 221 and 223 could be spaced apart due to the beam spacing errors. In this case, the resulting test patches obtained from the pattern 310 of turning the light beams on together and the pattern 320 of alternately turning on the light beams would be reversed from the test patches shown in FIG. 10.

It should be appreciated that any number of possible scan line patterns using the single light sources 202 and 203 can be generated, and that the scan line patterns are not limited to the patterns 310 and 320 shown in FIG. 10.

Figure 11:
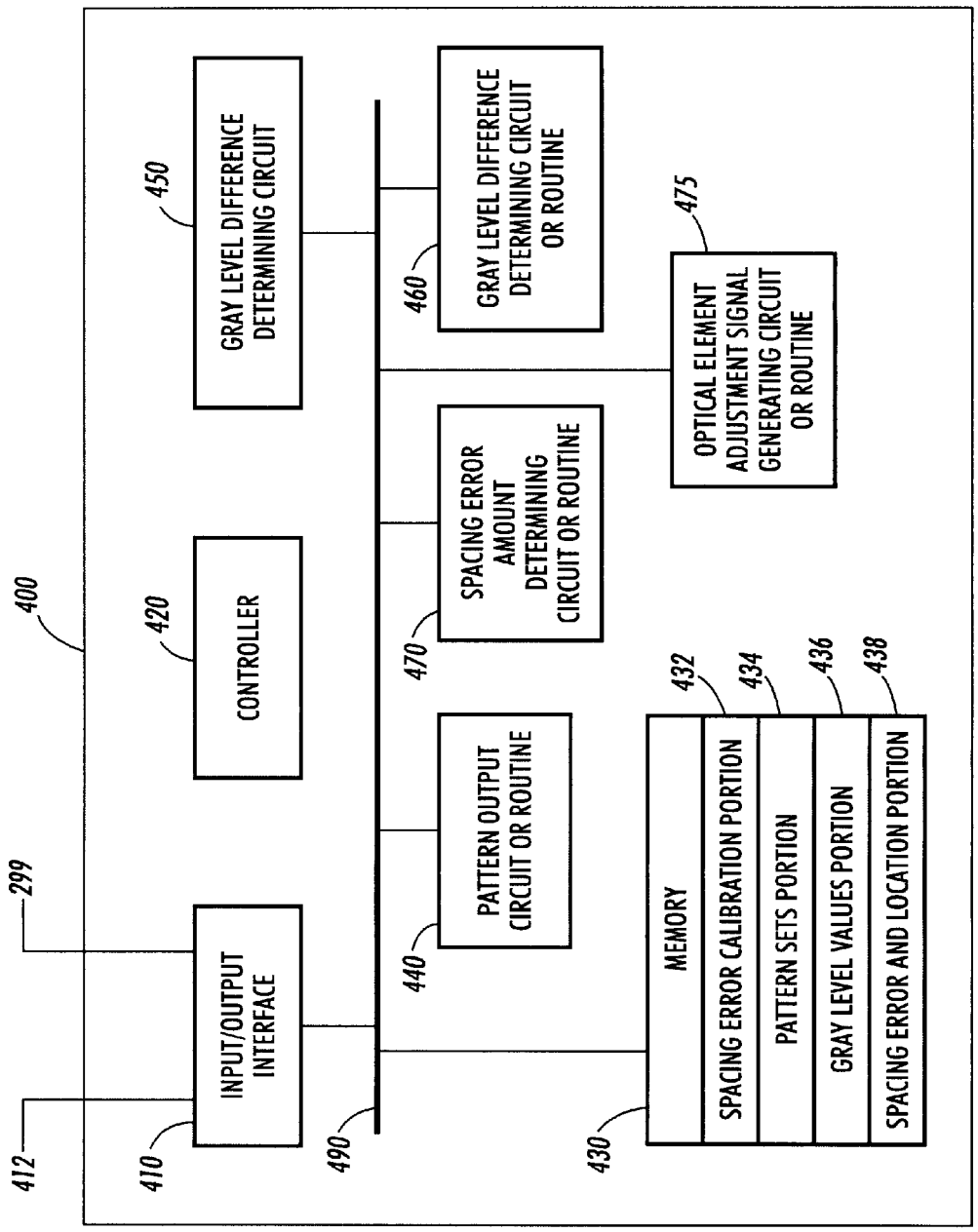
FIG. 11 is a block diagram outlining in greater detail a first exemplary embodiment of the controller of FIG. 8.

FIG. 11 is a block diagram outlining a first exemplary embodiment of the beam spacing error system 400. As shown in FIG. 11, in this first exemplary embodiment, the beam spacing error system 400 includes an input/output circuit or software interface 410, a controller 420, a memory 430, a pattern output circuit or routine 440, a gray level difference determining circuit or routine 450, a gray level differential determining circuit or routine 460, and a spacing error amount determining circuit or routine 470. The controller 420 coordinates communication between all of the circuits or software routines 430, 440, 450, 460, 480, 470 during operation.

The input/output interface circuit or software interface 410 receives signals sent over the signal lines 299 from the gray level measurement system 290 to the beam spacing error system 400 and outputs one or more signals produced by the beam spacing error system 400. In various exemplary variations of this first exemplary embodiment, the controller 400 both characterizes the beam spacing error and, based on the characterized beam spacing error, outputs control signals to one or more of the adjustable optical elements of the optical system over the signal lines 412. In other exemplary embodiments, the beam spacing error system 400 only characterizes the beam-to-beam spacing, but does not directly control any of the adjustable optical elements. In this case, the signal lines 412 from the input/output circuit or software interface 410 can be omitted. The beam spacing error system 400 instead outputs the beam spacing error data to another controller (not shown) over another signal line from the input/output circuit or software interface 410.

As shown in FIG. 11, the memory 430 includes one or more of at least four memory portions, including a spacing error calibration portion 432, a pattern set portion 434, a gray level values portion 436, and a spacing error and location portion 438. The gray level value calibration portion 432 stores calibration values that relate a measured gray level difference value $\Delta G$ to a beam-to-beam spacing error that results in that gray level difference value $\Delta G$. The pattern sets portion 434 contains sets of predetermined scan line patterns usable to measure a gray level of a toned area that is indicative of the beam-to-beam spacing error. In general, there will be at least two such sets of patterns which generate inverse images of each other. The gray level values portion 436 stores the determined differential gray level values $\Delta G_1$ and $\Delta G_2$ corresponding to the test patch areas detected on the photoreceptor 280. The spacing error and location portion 438 stores each determined spacing error and the location along the width of the photoreceptor where that spacing error occurred.

The memory 430 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-writeable optical disk and disk drive. A hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The pattern output circuit or software routine 440 provides control signals for driving the rotating polygon based optical system 200 to form scan line patterns on the photoreceptor 280. These signals are based on a pattern set selected by the controller 420 or the pattern output circuit or software routine 440 from those stored in the pattern set portion 434.

The gray level difference determining circuit or software routine 450 determines the differential gray level values $\Delta G_1$ and $\Delta G_2$ between the scan line patterns formed at a particular location of the photoreceptor 280 based on measured gray level values, such as, for example, the measured gray level values $G_{1A}$, $G_{1B}$, $G_{2A}$, and $G_{2B}$, resulting from the test patches shown in FIG. 10. The differential gray level values between $G_{1A}$ and $G_{1B}$ at a first portion and between $G_{2A}$ and $G_{2B}$ at a second portion of the photoreceptor 280 are denoted as $\Delta G_1$ and $\Delta G_2$, respectively. That is, $\Delta G_1 = G_{1A} - G_{1B}$ and $\Delta G_2 = G_{2A} - G_{2B}$. It should be appreciated that, as the length of the patterns 310 and 320 used to generate the values $G_{1A}$, $G_{1B}$, $G_{2A}$, and $G_{2B}$ increases on the photoreceptor along the direction of travel of the photoreceptor, i.e., as the patterns 310 and 320 are duplicated repeatedly along the direction of travel of the photoreceptor, the signal-to-noise ratio for these values increases.

It should be appreciated that, in various exemplary embodiments, the gray level difference determining circuit or software routine 450 can be omitted from the beam spacing error system 400. In this case, its functions are incorporated into the gray level measurement system 290. That is, in these exemplary embodiments, the gray level measurement system 290, rather than outputting the measured gray level values $G_{1A}$, $G_{1B}$, $G_{2A}$ and $G_{2B}$, outputs the differential gray level values $\Delta G_1$ and $\Delta G_2$.

As shown in FIG. 11, the gray level difference determining circuit or software routine 460 determines the gray level difference value $\Delta G$ between the differential gray level values $\Delta G_1$ and $\Delta G_2$, using the relationship $\Delta G = (\Delta G_1 - \Delta G_2)/2$. The spacing error amount determining circuit or software routine 470 determines the magnitude of the beam-to-beam spacing error based on the gray level difference value $\Delta G$ and the calibration values stored in the spacing error calibration portion 436. The spacing error amount determining circuit or software routine 470 stores the determined beam spacing error and the location along the width of the photoreceptor 280 where that error occurs in the spacing error and location portion 438.

The adjustments made to one or more of the adjustable optical elements in view of the determined beam spacing errors and location information for those errors are made using any appropriate methods and systems. Several types of methods and systems for adjusting the various optical elements are commercially available. Particularly, in various exemplary embodiments, the methods and systems described in U.S. Pat. No. 5,287,125 and 5,469,290, each incorporated herein by reference in its entirety, are used to implement the adjustments to the optical system 200 based on the determined beam-to-beam spacing error and location information stored in the spacing error and location portion 438.

It should be appreciated that, in various exemplary variations of this first exemplary embodiment, such adjustments can be made by adding an optical element adjustment signal generating circuit or routine 475 to the beam spacing error system 400 shown in FIG. 11. In this case, the optical element adjustment signal generating circuit or routine 475 inputs the beam spacing error and location information stored in the spacing error and location portion 438, and uses that information to generate control signals to one or more of the adjustable optical elements.

Figure 12:
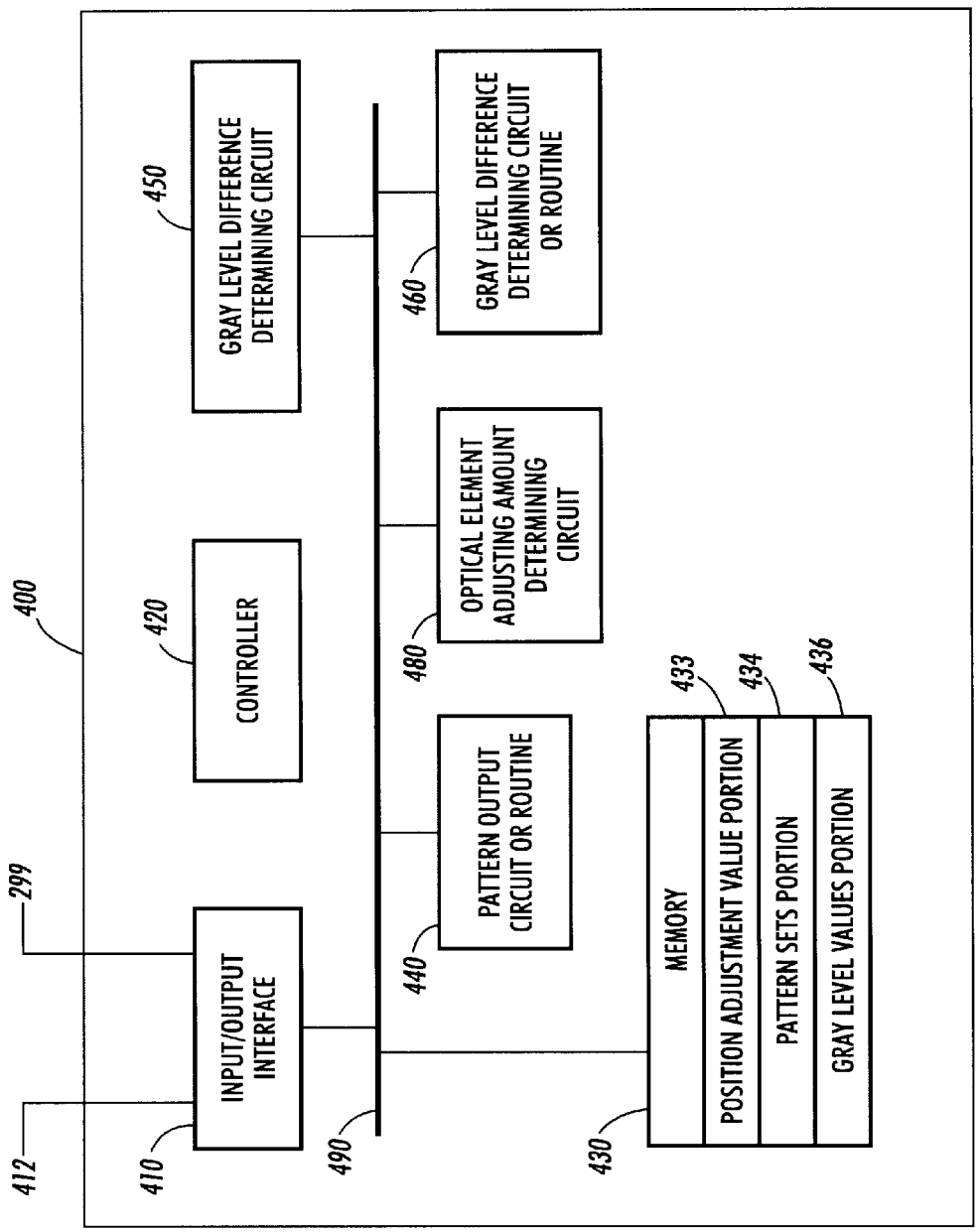
FIG. 12 is a block diagram outlining in greater detail a second exemplary embodiment of the controller of FIG. 8.

FIG. 12 shows a second exemplary embodiment of the beam spacing error system 400 of the optical system 200 used to reduce, measure or otherwise determine beam-to-beam spacing errors according to the invention. The beam spacing error system 400, as shown in FIG. 12, can include substantially the same circuits or software routines as the beam spacing error system 400 as shown in FIG. 11 in any of the various combinations discussed above with respect to FIG. 11. In the second exemplary embodiment of the beam spacing error system 400, the beam spacing error system 400 also includes an optical element adjusting amount determining circuit 480, but omits the optical element adjustment signal generating circuit 475.

In this second exemplary embodiment, the memory 430 includes one or more of a position adjustment value portion 433, the pattern set portion 434, and the gray level values portion 436. The position adjustment value portion 433 contains values corresponding to the amount of adjustment required at various locations along the photoreceptor 280 based on a determined value for $\Delta G$. The pattern set portion 434 contains sets of predetermined scan line patterns. The gray level values portion 436 stores the measured gray level values $G_{1A}$, $G_{2A}$, $G_{1B}$, and $G_{2B}$ corresponding to the test patch areas formed on the photoreceptor 280.

The optical element adjusting amount determining circuit or routine 480 first determines if the gray level difference value $\Delta G$ is zero or at least within a desired tolerance around zero. Alternatively, and essentially equivalently, the optical element adjusting amount determining circuit or routine 480 can determine if the differential gray level values $\Delta G_1$ and $\Delta G_2$ are both equal to zero, or are at least both within a desired tolerance around zero. If so, in either case, no further adjustments to any of the adjustable optical elements needs to be made. In this case, under control of the controller 420, the optical element adjusting amount determining circuit or routine 480 stores the current location along the width of the photoreceptor 280 and the values(s) of the current control signal(s), which was used to adjust one or more adjusted ones of the adjustable optical elements to reduce the beam spacing error, in the position adjustment value portion 433.

Otherwise, further adjustments to one or more of the adjustable optical elements need to be made. Accordingly, the gray level difference determining circuit or routine 460 determines the gray level difference value $\Delta G$ as outlined above. Then, the optical element adjusting amount determining circuit or routine 480 determines a new adjusting amount control signal for each of one or more of the adjustable optical elements based on the determined gray level difference value $\Delta G$.

As such, the second exemplary embodiment of the beam spacing error system 400 implements a kind of closed-loop control over the one or more adjustable optical elements. In particular, the differential gray level values $\Delta G_1$ and $\Delta G_2$ represent error signals. The gray level difference value $\Delta G$ generally indicates the direction and rough magnitude of the change that the optical element adjusting amount determining circuit or routine 480 must make to one or more of the adjustment signals to one or more of the adjustable optical elements that will tend to reduce the beam spacing error, as represented by the differential gray level values $\Delta G_1$ and $\Delta G_2$.

It should be appreciated that, in this second exemplary embodiment, the actual linear measurement in length units of the beam spacing error is not determined. Rather, the beam spacing error goes to zero as the gray level difference value $\Delta G$ goes towards zero. Thus, by making adjustments to one or more adjustable optical elements that move the gray level difference value $\Delta G$ towards zero, the net effect is to reduce the actual beam spacing error towards zero, at least for the location across the width of the photoreceptor 280 where the scan line patterns are being formed.

The adjustments made by this second exemplary embodiment are made using methods and systems apparent to those of ordinary skill in the art. Several types of methods and systems for adjusting the various optical elements are commercially available. Particularly, in various exemplary embodiments, the methods and systems described in the incorporated 125 and 290 patents can be used to implement the adjustments to the optical system 200.

Figure 13:
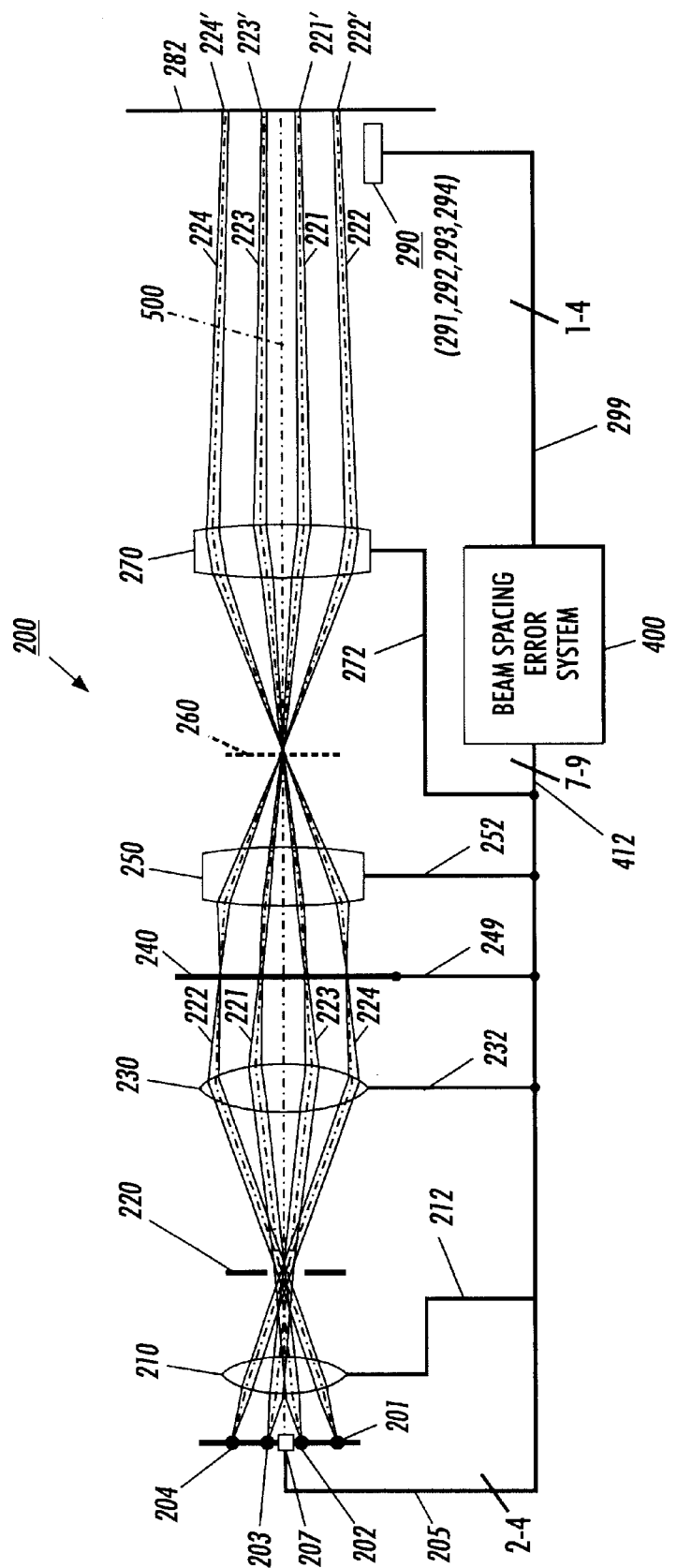
FIG. 13 shows a side elevation view of one exemplary embodiment of an ROS image forming device according to this invention using two prealigned dual laser diodes according to this invention.
Figure 14:
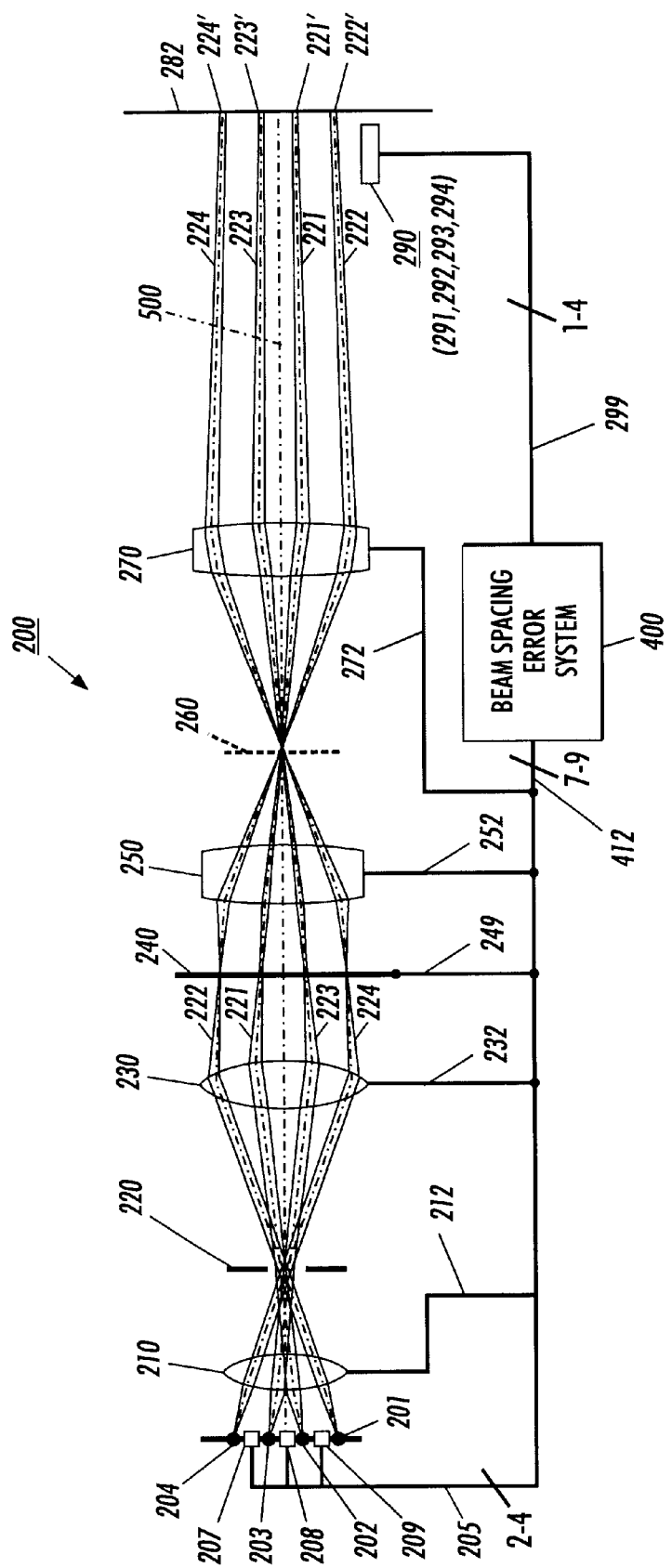
FIG. 14 shows a side elevation view of one exemplary embodiment of an ROS image forming device according to this invention using four single laser diodes.

FIGS. 13 and 14 show third and fourth exemplary embodiments, respectively, of the optical system 200 used to reduce, measure or otherwise determine beam-to-beam spacing errors according to the invention. The optical system 200, as shown in FIGS. 13 and 14, includes substantially the same optical elements as the optical system 200 shown in FIGS. 8 and 9. A detailed description of the beam-to-beam error adjustments made to the second and third embodiments of the optical system 200 is not provided because the adjustments are substantially the same as those described with respect to the first exemplary embodiment of the optical system 200.

In the third and fourth exemplary embodiments, the optical system 200 includes four light sources 201, 202, 203, and 204. These light sources 201, 202, 203, and 204 can be of any of the types of light sources discussed with respect to the first exemplary embodiment shown in FIGS. 8 and 9. In particular, in various exemplary embodiments, the light sources 201, 202, 203, and 204 are laser diodes that emit corresponding laser beams as the light beams 222, 221, 223, and 224.

As shown in FIG. 13 in the third exemplary embodiment of the optical system 200, the light sources 201, 202, 203, and 204 are implemented using two pre-aligned dual light sources. As shown in FIG. 14, in the fourth exemplary embodiment of the optical system 200, the light sources 201, 202, 203 and 204 are implemented using individual light sources. It should be appreciated that two pre-aligned dual light sources require fewer adjustments than using four single light sources.

As shown in FIGS. 13 and 14, the light beams 222, 221, 223, and 224 pass through the optical elements 210, 220, 230, 240, 250, 260, and 270 to form scanning spots 222', 221', 223', and 224', respectively, on the image plane 282. The scanning spots 222', 221', 223', and 224' move across the image plane 282 to form the nominal scan lines 175. The scan lines 175 thus formed have the previously-described beam-to-beam spacing errors, which can include bow line distortions and/or semi-static errors.

Figure 15:
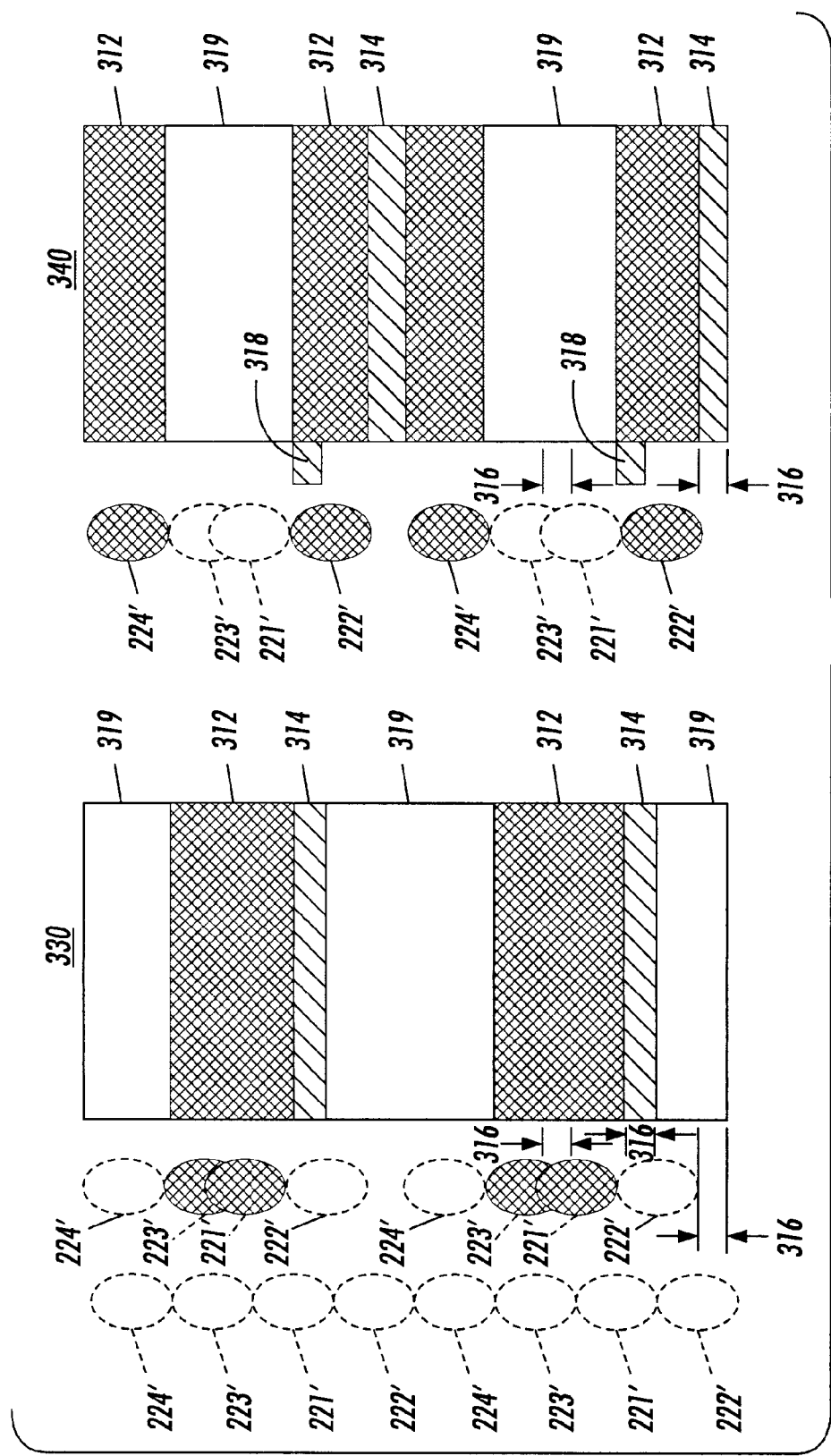
FIG. 15 illustrates a set of patterns usable to determine beam spacing offset between raster lines on the photoreceptor device produced by quad laser diodes, according to this invention.

FIG. 15 shows examples of two scan line patterns 330 and 340 formed in a test patch found on a photoreceptor 280. The scan line patterns 330 and 340 are formed using the two pre-aligned dual light sources of the third exemplary embodiment of the optical system 200 shown in FIG. 13.

FIG. 15 shows a hatched area 314 which represents the clear portion 319 that should be part of the toned area portion 312. The hatched area 314 has a height 316. Additionally, the toned area portion 312, which should be part of the clear portion 319, has a height 318.

As shown in FIG. 15, the dashed ovals on the far left of the Figure represent the ideal arrangement of the scan spots 221', 222', 223' and 224' into the scan lines 175 at the image plane 282, for each pass of the light beams 221, 222, 223 and 224. The scan line pattern 330 represents a pattern where two of the light sources 202 and 203 of the four light sources 201, 202, 203, and 204, having one or more of the above-outlined beam spacing errors, are turned on for each pass, while the other light sources 201 and 204 are turned off. As shown in FIG. 15, the scan spots 221' and 223', and thus the resulting scan lines overlap and widen the clear portion 319 between passes, distorting the desired pattern 330.

The right side of FIG. 15 shows a second scan line pattern 340. The second scan line pattern 340 represents a pattern where two other light sources 201 and 204 of the four light sources 201, 202, 203 and 204, having one or more of the above-outlined beam spacing errors, are turned on for each pass, while the other light sources 202 and 203 are turned off. As shown in FIG. 15, the scan spots 222' and 224', and thus, the resulting scan lines are spaced apart by a gap, shown as hatched area 314, between the scan lines due to the overlap between scan spots 221' and 223', distorting the desired pattern 340.

It should be appreciated that, if there is no spacing error in the positions of the light beams 221, 222, 223 and 224 on the image plane 282, the two scan line patterns 330 and 340 would be identical in the relative size of the toned to untoned areas but out of phase. Additionally, the toned area 312 and the clear area 319 would be the same size and would not be broken up into sub-areas, as on the scan line patterns 330 and 340 shown in FIG. 15.

It should also be appreciated that, in the third exemplary embodiment shown in FIG. 15, the light beams 221, 222, 223 and 224 overlap due to the beam spacing errors. In contrast, the light beams 221, 222, 223 and 224 could be spaced apart due to the beam spacing errors. In this case, the resulting test patches obtained from the pattern 330 and the pattern 340 would be reversed from the test patches shown in FIG. 15.

It should be appreciated that any number of possible scan line patterns using the light sources 201, 202, 203 and 204 can be generated, using pre-aligned dual light sources of the third exemplary embodiment of the invention or individual light sources of the fourth exemplary embodiment of the invention. Additionally, it should be appreciated that the scan line patterns are not limited to the patterns 330 and 340 shown in FIG. 15.

Figure 16:
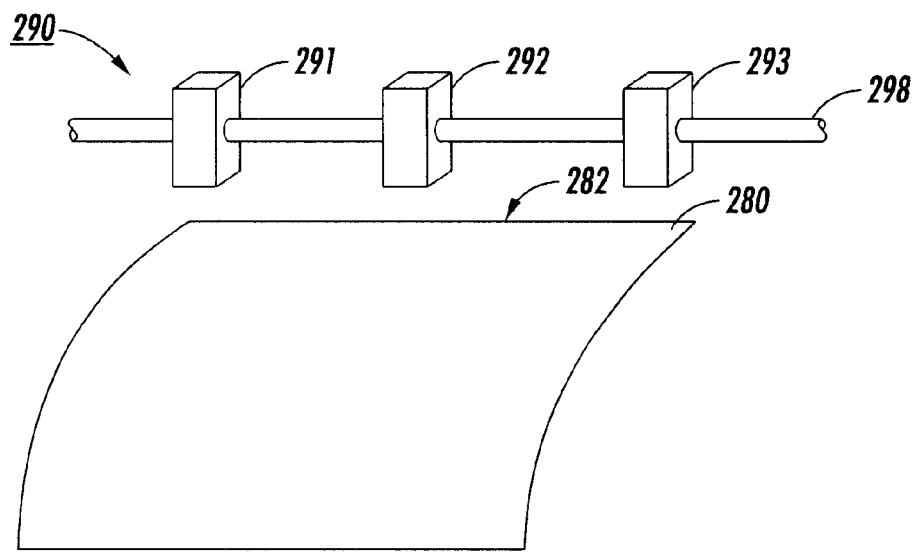
FIG. 16 illustrates one exemplary embodiment of three sensors mounted over the width of a photoreceptor usable as the gray level measurement device of FIG. 8.

FIG. 16 shows the gray level measurement system 290 of a fifth exemplary embodiment of the optical system 200 used to measure or otherwise determine beam-to-beam spacing errors according to the invention. The fifth embodiment of the optical system 200 includes substantially the same optical elements as the first, second, third, and fourth exemplary embodiments of the optical system 200. Consequently, a detailed description of the optical elements comprising the optical system 200 and of the beam-to-beam error adjustment of the fifth exemplary embodiment is not provided, because the optical elements and the adjustments for this fifth exemplary embodiment are substantially the same as the previous embodiments.

As shown in FIG. 16, in this fifth exemplary embodiment of the optical system 200, the gray level measurement system 290 comprises three densitometers 291, 292 and 293 located near the photoreceptor 280. In this embodiment, the three densitometers 291, 292 and 293 are located on a lead screw 298, and thus can be located at different locations along the width of the photoreceptor 280. In various exemplary embodiments, the densitometers 291, 292 and 293 of this fifth exemplary embodiment are also enhanced toner area coverage sensors, as discussed with regard to the first exemplary embodiment of this invention. Accordingly, each of the densitometers 291, 292 and 293 detect a gray level of the toned area within their respective viewing areas. The gray level measurement system 290 sends corresponding signals to the controller 300, so that the beam-to-beam spacing errors may be determined at each location, or so that one or more control signals may be determined that adjust one or more optical elements such that the beam-to-beam spacing error tends towards zero.

It should be appreciated that the densitometers 291, 292 and 293 may be located with respect to the photoreceptor 280 in any manner and are not required to be mounted on the lead screw 298, as shown in FIG. 16. Additionally, it should be appreciated that the densitometers 291, 292 and 293 may be located at any set of locations along the length of the photoreceptor 280, so long as the densitometers 291, 292 and 293 are able to detect the toned areas of test patches on the photoreceptor 280.

Figure 17:
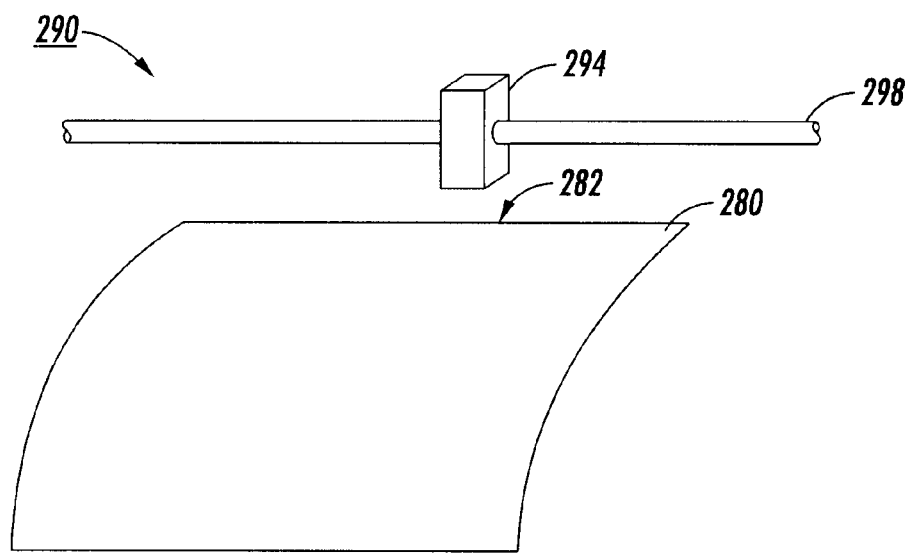
FIG. 17 illustrates one exemplary embodiment of a movable sensor mounted on a lead screw usable as the gray level measurement device of FIG. 8.

FIG. 17 shows the gray level measurement system 290 of a sixth exemplary embodiment of the optical system 200 used to measure or otherwise determine beam-to-beam spacing errors according to the invention. The sixth embodiment of the optical system 200 includes substantially the same optical elements as the first, second, third, fourth, and fifth exemplary embodiments of the optical system 200. Consequently, a detailed description of the optical elements comprising the optical system 200 and the beam-to-beam error adjustment of the sixth exemplary embodiment is not provided because the optical elements and the adjustment for this sixth exemplary embodiment are substantially the same as the previous embodiments.

As shown in FIG. 17, in this sixth exemplary embodiment, the gray level measurement system 290 comprises a single movable densitometer 294. The densitometer 294 is not fixedly located at a specific position along the width of the photoreceptor 280. Instead, the densitometer 294 moves along the width of photoreceptor 280 and is able to detect toned areas of test patches at different locations over the full width of the photoreceptor 280.

FIG. 17 specifically shows the densitometer 294 movably mounted on the lead screw 298. The densitometer 294 of this sixth exemplary embodiment is also the same type of enhanced toner area coverage sensor (ETAC sensor) discussed with regard to the first exemplary embodiment of this invention. Accordingly, the densitometer 294 detects the toned areas of test patches on the photoreceptor 280 and the gray level measurement system 290 sends one or more corresponding signals to the controller 300 so that a beam-to-beam adjustment may be implemented.

It should be appreciated that the densitometer 294 may be located at any set of one or more positions along the width of the photoreceptor 280 in any manner, so long as the densitometer 294 moves across the width of the photoreceptor 280. Further, the densitometer 294 does not have to be mounted on the lead screw 298, as shown in FIG. 17. Additionally, it should be appreciated that the densitometer 294 may be variously located at any point along the length of the photoreceptor 280, so long as the densitometer 294 is able to detect the toned areas of test patches on the photoreceptor 280.

Figure 18:
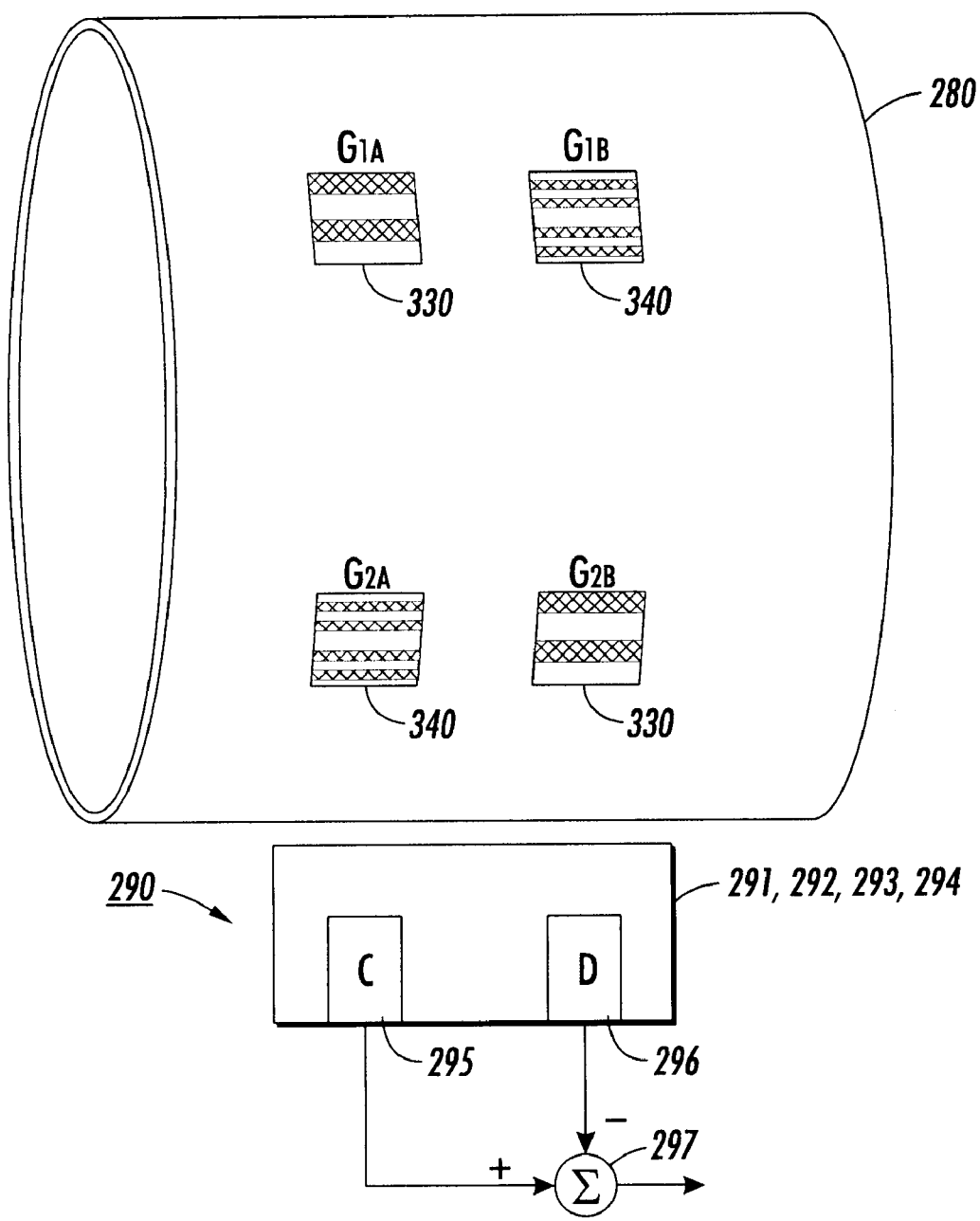
FIG. 18 illustrates one exemplary embodiment of a differential sensor usable as the gray level measurement device of FIG. 8.

FIG. 18 shows the photoreceptor 280 having test patterns formed using the two scan line patterns 330 and 340. FIG. 18 also shows the orientation of one of the densitometers 291–294 of the gray level measurement system 290 with respect to the raster scan line patterns 330 and 340. As shown in FIG. 18, in various exemplary embodiments, each densitometer 291–294 includes a pair of detectors 295 and 296 that are aligned with a set of paired test patch patterns 310 and 320, or 330 and 340. That is, each detector 295 and 296 is presented with both of the patterns 310 and 320, or 330 and 340, during a single measurement of the beam-to-beam spacing error at a given location.

As the detector 295 is presented with the test patch patterns 310 and 320, or 330 and 340, the detector 295 outputs analog signals having amplitudes that correspond to the relative gray levels of the toned areas of the patterns 310 or 330, and 320 or 340, respectively. These magnitudes correspond to the measured gray level values $G_{1A}$ and $G_{2A}$, respectively. As the detector 296 is presented with the test patch patterns 320 or 340, and 310 or 330, respectively, the detector 296 outputs analog signals having amplitudes that correspond to the relative gray levels of the toned areas of the test patch patterns 320 or 340, and 310 or 330, respectively. These magnitudes correspond to the measured gray level values $G_{1B}$ and $G_{2B}$, respectively.

The differential gray level values $\Delta G_1$ and $\Delta G_2$, between $G_{1A}$ and $G_{1B}$, and $G_{2A}$ and $G_{2B}$, respectively, or the gray level difference $\Delta G$ derived from $\Delta G_1$, and $\Delta G_2$, are used to determine whether an adjustment may be necessary, as outlined above. If either one of the differential gray level values $\Delta G_1$ and $\Delta G_2$ does not equal zero, adjustments to one or more adjustable optical elements may be necessary to reduce the beam spacing error. However, in various exemplary embodiments, if the gray level difference value $\Delta G$ is zero, or within a desired tolerance of zero, or equivalently, if both of the differential gray level values $\Delta G_1$ and $\Delta G_2$ are within a predetermined tolerance of zero, as outlined above, then the adjustments to one or more adjustable optical elements are not necessary.

It should be appreciated that the greater the number of densitometers 291, 292, 293 and 294 provided in the gray level measurement system 290, the better the overall scan line beam-to-beam adjustment will be in reducing or removing the beam spacing error. Consequently, as shown in FIG. 17, the first and third exemplary embodiments may be modified to include a gray level measurement system 290 having three enhanced toner area coverage sensors 291, 292, and 293, so that better beam-to-beam spacing adjustments can be determined. It should be appreciated that any number of densitometers 291–294 may be used and that the number is not limited to that shown in FIG. 17.

Figure 19:
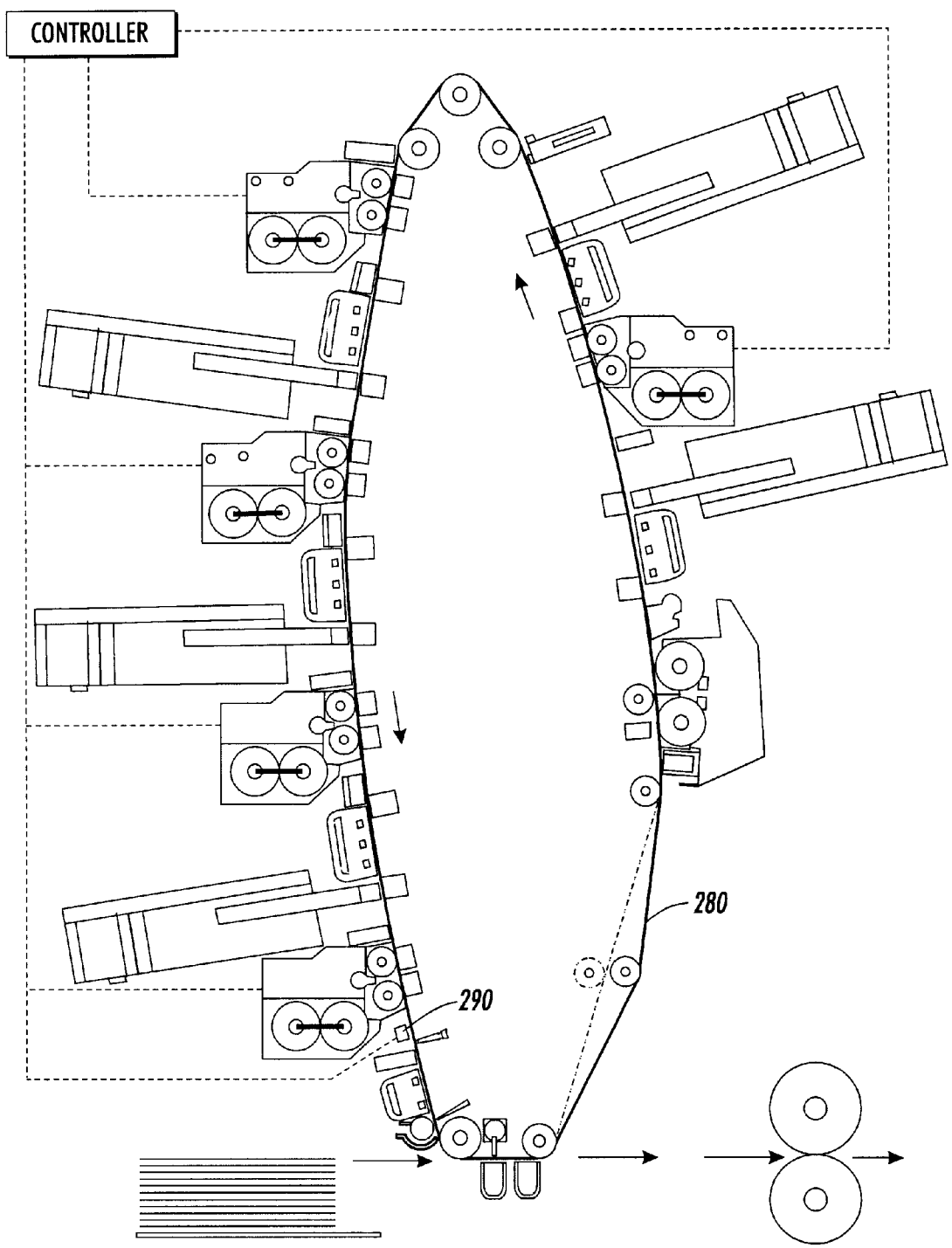
FIG. 19 shows a side plan view of an image forming apparatus comprising an ROS image exposure station and at least one sensor according to this invention.

FIG. 19 shows an ROS image exposure station having a photoreceptor 280 and a gray level measurement system 290 according to this invention. It should be appreciated that the gray level measurement system 290 of this invention may be located anywhere along the length of the photoreceptor 280, so long as the gray level measurement system 290 is able to detect the gray level of toned areas on the photoreceptor 280.

Figure 20A:
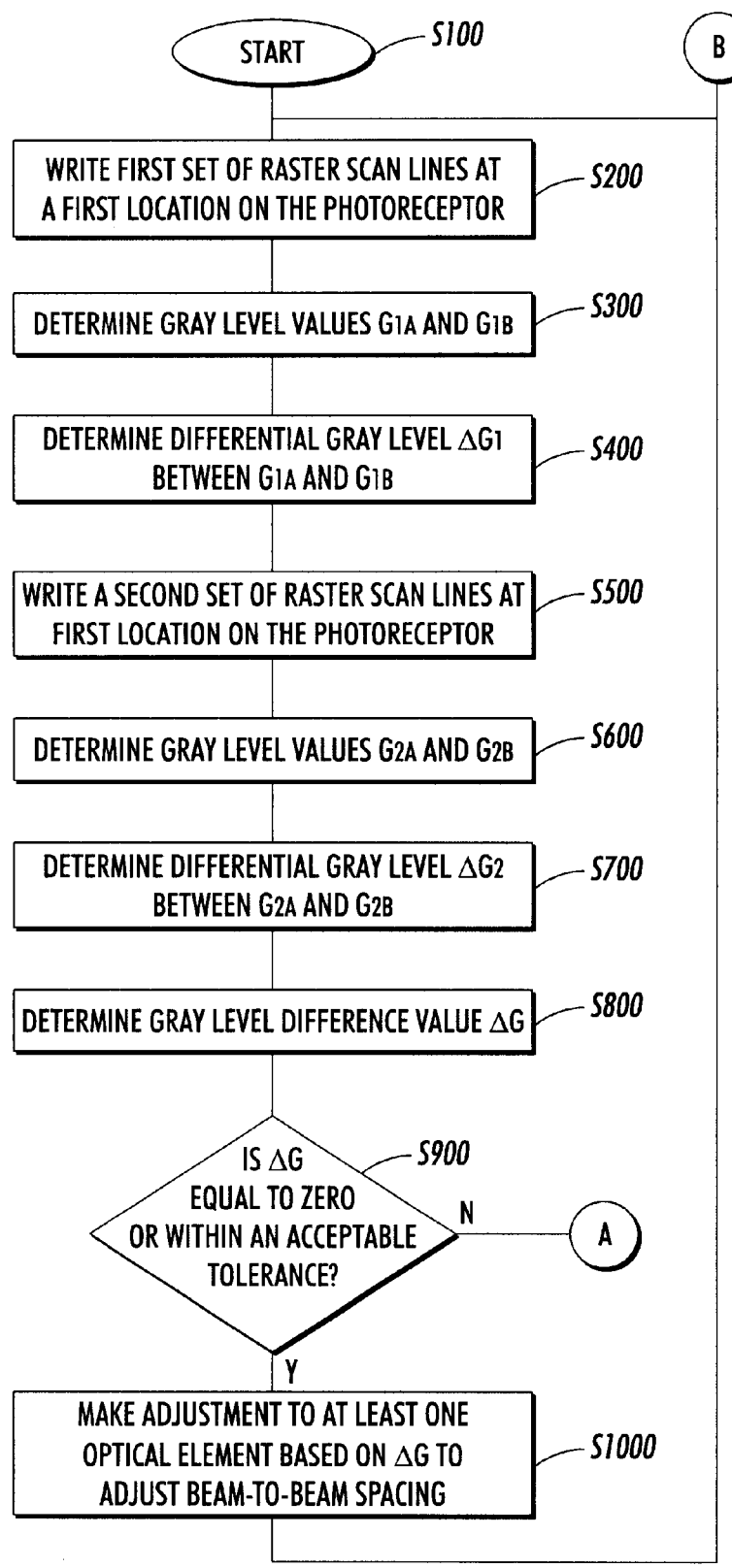
FIGS. 20A and 20B are a flowchart outlining one exemplary embodiment of a method for reducing beam-to-beam spacing errors.
Figure 20B:
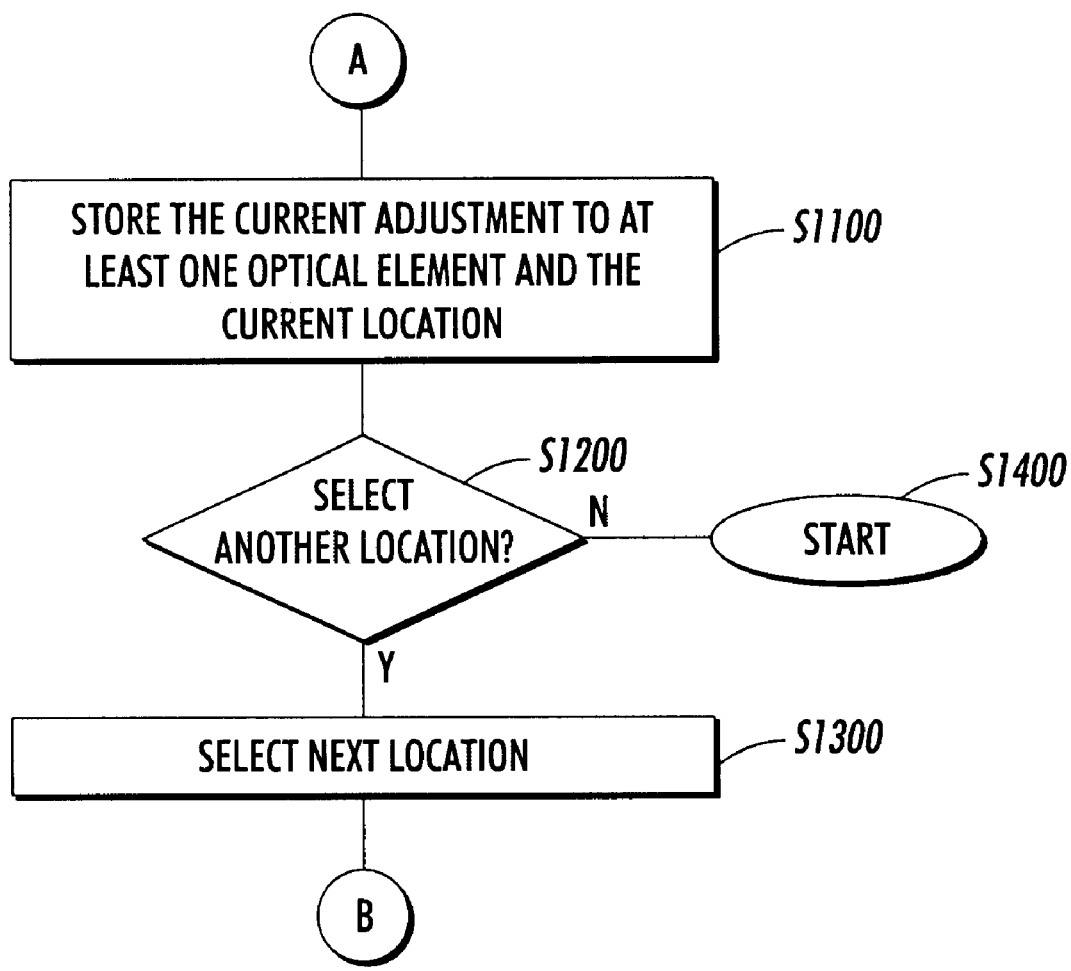

FIGS. 20A and 20B are a flowchart outlining one exemplary embodiment of a method for reducing beam-to-beam spacing error according to this invention. Beginning in step S100, operation continues to step S200, where a first set of raster scan lines are written on the photoreceptor at a first location across the width of the photoreceptor, where the first set of raster lines extends on the photoreceptor along the direction of travel of the photoreceptor. Then, in step S300, the measured gray level values $G_{1A}$ and $G_{1B}$ of the toned areas of each raster scan line pattern are determined. Next, in step S400, the differential gray level value $\Delta G_1$, is determined between the measured gray levels $G_{1A}$ and $G_{1B}$ of the first set of raster scan lines. Operation then continues to step S500.

In step S500, a second set of raster scan lines are written on the photoreceptor at the first location across the width of the photoreceptor, where the second set of raster lines extends on the photoreceptor along the direction of travel of the photoreceptor. Next, in step S600, the measured gray level values $G_{2A}$ and $G_{2B}$ of the toned areas of each raster scan line pattern are determined. Then, in step S700, the differential gray level value $\Delta G_2$ is determined between the measured gray levels $G_{2A}$ and $G_{2B}$ of the second set of raster scan lines. Operation then continues to step S800.

In step S800, the gray level difference value $\Delta G$ between the first and second differential gray level values $\Delta G_1$ and $\Delta G_2$ is determined. It should be appreciated that the absolute values of the first and second differential gray level values $\Delta G_1$ and $\Delta G_2$ should be used so that an accurate average value is calculated. Then, in step S900, a determination is made whether the gray level difference value $\Delta G$ is equal to zero or within an acceptable tolerance around zero. If not, some beam-to-beam spacing error is considered to exist at this location along the photoreceptor. Accordingly, operation continues to step S1000. Otherwise, operation jumps to step S1100.

In step S900, an adjustment is made to at least one optical element to reduce the beam-to-beam spacing. In various exemplary embodiments, this adjustment is made by generating at least one control signal based on the value of the gray level difference value $\Delta G$. The at least one control signal alters the at least one optical element to move the location of at least one of beams of light on the photoreceptor at the current location across the width of the photoreceptor. Operation then returns to step S200. The process of steps S200–S1000 is then repeated until at most a predetermined amount of beam spacing error remains.

In contrast, in step S1100, the current location on the photoreceptor requiring the adjustment and the at least one control signal that alters the at least one optical element to obtain the current adjustment to the location of at least one of beams of light on the photoreceptor at the current location is recorded. Next, in step S1200, a determination is made whether another location along the width of the photoreceptor is to be analyzed to determine the at least one control signal for that location that reduces the gray level difference value $\Delta G$ to at least within the determined or predetermined tolerance around zero. If not, operation jumps to step S1400, where operation of the method ends. In contrast, if another location is to be analyzed, operation continues to step S1300.

In step S1300, a next location across the width of the photoreceptor is selected. It should be appreciated that the next location across the width of the photoreceptor can be selected by moving a current gray level detector element across the width of the photoreceptor, by switching to another gray level detector element that is positioned at a different location across the width of the photoreceptor, or both. Operation then jumps back to step S200.

Figure 21:
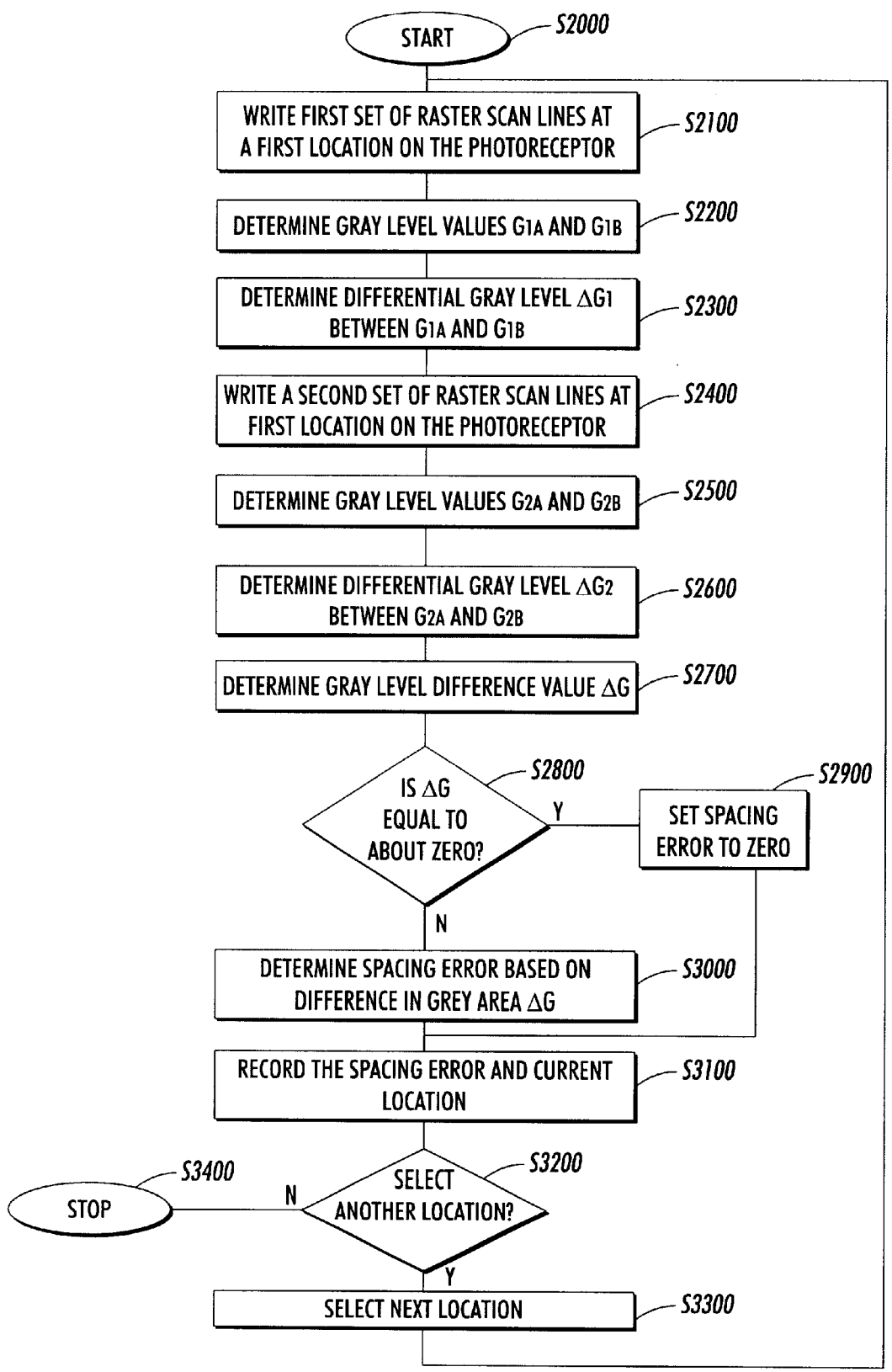
FIG. 21 is a flowchart outlining one exemplary embodiment of a method for determining beam-to-beam spacing errors.

FIG. 21 is a flowchart outlining one exemplary embodiment of a method for reducing beam-to-beam spacing error according to this invention. Beginning in step S2000, operation continues to step S2100, where a first set of raster scan lines are written on the photoreceptor at a first location across the width of the photoreceptor, where the first set of raster lines extends on the photoreceptor along the direction of travel of the photoreceptor. Then, in step S2200, the measured gray level values $G_{1A}$ and $G_{1B}$ of the toned areas of each raster scan line pattern are determined. Next, in step S2300, the differential gray level value $\Delta G_1$ is determined between the determined gray levels $G_{1A}$ and $G_{1B}$ of the first set of raster scan lines. Operation then continues to step S2400.

In step S2400, a second set of raster scan lines are written on the photoreceptor at the first location across the width of the photoreceptor, where the second set of raster lines extends on the photoreceptor along the direction of travel of the photoreceptor. Next, in step S2500, the measured gray level values $G_{2A}$ and $G_{2B}$ of the toned areas of each raster scan line pattern are determined. Then, in step S2600, the differential gray level value $\Delta G_2$ is determined between the determined gray levels $G_{2A}$ and $G_{2B}$ of the second set of raster scan lines. Operation then continues to step S2700.

In step S2700, the gray level difference value ΔG between the first and second differential gray level values ΔG, and ΔG$_2$ is determined. It should be appreciated that the absolute values of the first and second differential gray level values ΔG$_1$ and ΔG$_2$ should be used so that an accurate average value is calculated. Then, in step S2800, a determination is made whether the gray level difference value ΔG is equal to zero or within an acceptable tolerance around zero. If so, the beam-to-beam spacing error is considered to be effectively zero at this location along the photoreceptor. Accordingly, operation continues to step S2900. Otherwise, operation jumps to step S3000.

In step S2900, the spacing error is set to zero. Operation then jumps to step S3100. In contrast, in step S3000, the spacing error is determined based on the gray level difference value ΔG. In various exemplary embodiments, a calibration table or equation is used to convert the gray level difference value ΔG to the equivalent beam-to-beam spacing error. Operation then continues to step S3100.

In step S3100, the spacing error and the current location across the width of the photoreceptor are recorded. Next, in step S3200, a determination is made whether another location along the width of the photoreceptor is to be analyzed to determine the beam-to-beam spacing error for that location across the width of the photoreceptor. If not, operation jumps to step S3400, where operation of the method ends. In contrast, if another location is to be analyzed, operation continues to step S3300.

In step S3300, a next location across the width of the photoreceptor is selected. It should be appreciated that the next location across the width of the photoreceptor can be selected by moving a current gray level detector element across the width of the photoreceptor, by switching to another gray level detector element that is positioned at a different location across the width of the photoreceptor, or both. Operation then jumps back to step S2100.

The beam spacing error system 400 is, in various exemplary embodiments, implemented on a programmed general purpose compute. However, the beam spacing error system 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 20 and 21, can be used to implement the beam spacing error system 400.

Moreover, the beam spacing error system 400 can be implemented as software executing on a programmed general purpose computer, a special purpose computer, a microprocessor or the like. In this case, the beam spacing error system 400 can be implemented as a routine embedded in a printer control system or controller or the like. That is, the beam spacing error system 400 can be implemented by physically incorporating it into a software and/or hardware system, such as the hardware and software systems of a printer or a digital photocopier.

It should be appreciated that each of the circuits or routines shown in FIGS. 11 and 12 can be implemented as portions of a suitably programmed general purpose computer. Alternatively, each of the circuits or routines shown in FIGS. 11 and 12 can be implemented as physically distinct hardware circuits within an ASIC, or using a FPGA, a PDL, a PLA, or a PAL, or using discrete logic elements or discrete circuit elements. The particular form each of the circuits shown in FIG. 11 will take is a design choice and will be obvious and predictable to those skilled in the art.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

What is claimed is:

1. An image forming apparatus, comprising:

a photoreceptor;

an imaging system that controllably scans a plurality of light beams across the photoreceptor to form an image on the photoreceptor and comprising at least one adjustable element;

at least one gray level detector located adjacent to the photoreceptor, said at least gray level detector usable to detect a developed area of a test patch image formed on the photoreceptor using the imaging system, the test patch image containing a pattern of developed regions that is indicative of an amount of beam spacing error between the plurality of light beams; and a control system connected to the at least one gray level detector and the imaging system, the control system usable to determine at least one differential gray level value based on output signals from the at least one gray level detector when detecting the test patch image.

2. The image forming apparatus of claim 1, wherein the gray level measurement device detects at least one of a specular reflection and a diffuse reflection, and generates at least one of a specular reflection signal and a diffuse reflection signal.

3. The image forming apparatus of claim 1, wherein the at least one gray level detector comprises at least an enhanced area toner coverage sensor.

4. The image forming apparatus of claim 3, wherein the enhanced toner area coverage sensor detects at least one of a specular reflection and a diffuse reflection, and generates at least one of a specular reflection signal and a diffuse reflection signal as the output signals.

5. The image forming apparatus of claim 1, wherein the at least one gray level detector comprises at least two gray level detectors, one of the at least two gray level detectors located adjacent to and at each end of the photoreceptor.

6. The image forming apparatus of claim 5, wherein the control system outputs sets of raster scan line patterns to the imaging system to write the test patch image on the photoreceptor.

7. The image forming apparatus of claim 5, wherein the first and second sets of raster scan lines are written on both a first portion and a second portion of the photoreceptor.

8. The image forming apparatus of claim 5, wherein a gray level differential determining circuit or routine determines a first differential gray level value based on gray level value signals output by one of at least one gray level detector between the first and second set of raster scan lines on the first portion of the photoreceptor, and a second differential gray level value based on gray level value signals output by one of the at least one gray level detector between the first and second set of raster scan lines on the second portion of the photoreceptor.

9. The image forming apparatus of claim 8, wherein the control system further comprises an optical element adjusting amount determining circuit that determines, based on the first and second differential gray level values, at least one optical element to adjust and a magnitude of an adjustment to that optical element, and sends a corresponding adjustment signal to that optical element.

10. The image forming apparatus of claim 8, wherein a gray level difference determining circuit or routine determines a gray level difference value based on the first differential gray level value and the second differential gray level value.

11. The image forming apparatus of claim 1, the control system further comprising a spacing error amount determining circuit or software routine usable to determine a magnitude of the beam spacing error based on the at least one differential gray level value.

12. The image forming apparatus of claim 1, wherein the at least one gray level detector is movable along a line generally parallel to a rotational axis of the photoreceptor.

13. The image forming apparatus of claim 1, wherein the control system outputs at least one control signal to at least one of the at least one adjustable element of the imaging system to reduce the beam spacing error indicated in the test patch images detected by the at least one gray level detector.

14. A method for determining at least one differential gray level value resulting from beam-to-beam spacing errors between positions of a plurality of light beams on a photoreceptor, comprising:

controllably scanning a plurality of light beams across the photoreceptor using an imaging system to form an image on the photoreceptor, the imaging system comprising at least one adjustable element;

detecting a developed area of a test patch image formed on the photoreceptor using the imaging system, the test patch image containing a pattern of developed regions that is indicative of an amount of beam spacing errors between the plurality of light beams;

generating a gray level value signal based on the detected test patch image; and determining at least one differential gray level value based on the generated gray level value signals.

15. The method of claim 14, wherein detecting the developed area comprises detecting the developed area of a test patch image using at least one enhanced toner coverage sensor.

16. The method of claim 14, wherein detecting the developed area comprises detecting the developed area of a test patch image using at least two gray level detectors, the at least two gray level detectors located adjacent to and at each end of the photoreceptor.

17. The method of claim 14, wherein detecting the developed area comprises detecting the developed area of a test patch image using at least one gray level detector that is movable along a line parallel to a rotational axis of the photoreceptor.

18. The method of claim 14, wherein controllably scanning comprises controllably scanning at least one pattern of developed areas that is usable to indicate the amount of beam spacing error.

19. The method of claim 14, further comprising selecting at least one set of raster scan lines to write on the photoreceptor image plane, wherein controllably scanning comprises forming patterns on the photoreceptor based on the selected sets of raster scan lines.

20. The method of claim 14, wherein detecting the developed area comprises determining gray levels of toned areas of a first set and a second set of raster scan line patterns at each one of a plurality of sensor locations.

21. The method of claim 14, wherein controllably scanning comprises writing the first and second sets of raster scan line patterns on both a first and a second portion of the photoreceptor.

22. The method of claim 14, further comprising determining a first differential gray level value between the gray level values for the first and second set of raster scan line patterns on the first portion of the photoreceptor, and a second differential gray level value between the gray level values for the first and second set of raster scan line patterns on the second portion of the photoreceptor.

23. The method of claim 22, further comprising determining a gray level difference value between the first differential gray level value and the second differential gray level value.

24. The method of claim 23, further comprising:

determining at least one optical element to adjust and a magnitude of adjustment of that optical element based on the gray level difference value; and outputting a corresponding adjustment signal to the determined at least one optical element based on the determined magnitude of adjustment.

25. The method of claim 23, further comprising determining a beam spacing error based on the determined gray level difference value and at least one calibration value, each calibration value representing a predetermined beam spacing error and a corresponding gray level difference value.

* * * * *